(12) United States Patent
Kang et al.

(10) Patent No.: US 12,092,923 B2
(45) Date of Patent: Sep. 17, 2024

(54) BACKLIGHT SYSTEM

(71) Applicant: SAMSUNG ELECTRONICS CO., LTD., Suwon-si (KR)

(72) Inventors: Sugyeung Kang, Suwon-si (KR); Kangjoo Kim, Hwaseong-si (KR); Taehyeon Kwon, Seoul (KR); Sunkwon Kim, Hwaseong-si (KR); Sewoong Ahn, Hwaseong-si (KR); Sungmok Lee, Hwaseong-si (KR); Yilho Lee, Seoul (KR); Jongsung Lee, Suwon-si (KR); Changyeon Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/940,619

(22) Filed: Sep. 8, 2022

(65) Prior Publication Data

US 2023/0205000 A1 Jun. 29, 2023

(30) Foreign Application Priority Data

Dec. 23, 2021 (KR) ........................ 10-2021-0185925

(51) Int. Cl.
*G02F 1/1335* (2006.01)
*G02F 1/13357* (2006.01)

(52) U.S. Cl.
CPC .. *G02F 1/133603* (2013.01); *G02F 1/133612* (2021.01)

(58) Field of Classification Search
CPC ......... G02F 1/133612; G02F 1/133601; G02F 1/133603; G09G 3/3426; G09G 3/3406; G09G 3/32; G09G 2320/062; G09G 2310/0243; G09G 2310/0286; G09G 3/2085; G09G 3/2088; G09G 3/3233; H05K 2201/10106; H01L 25/0753; G09F 9/33

See application file for complete search history.

(56) References Cited

U.S. PATENT DOCUMENTS

| 8,144,087 | B2 | 3/2012 | Lee |
| 8,797,235 | B2* | 8/2014 | Koebrich ............. G09G 3/2088 |
| | | | 345/1.3 |
| 2005/0151228 | A1 | 7/2005 | Tanida et al. |
| 2008/0136348 | A1 | 6/2008 | Varrin et al. |
| 2009/0121652 | A1* | 5/2009 | Kang ................ G02F 1/133603 |
| | | | 315/297 |

(Continued)

FOREIGN PATENT DOCUMENTS

| JP | 2005-167093 A | 6/2005 |
| KR | 10-2011-0037331 A | 4/2011 |

*Primary Examiner* — Omar Rojas Cadima
(74) *Attorney, Agent, or Firm* — Fish & Richardson P.C.

(57) ABSTRACT

A backlight system includes a plurality of pixel ICs respectively including a plurality of channels connected to a plurality of LEDs and that control the LEDs to be turned on and off through the channels, and a driver IC connected to the pixel ICs and that supplies a data signal to each of the pixel ICs. The pixel ICs include a first pixel IC connected to first LEDs and a second pixel IC connected to second LEDs. The first pixel IC turns the first LEDs on or off in a first order based on first control data included in the data signal, and the second pixel IC turns the second LEDs on or off in a second order different from the first order based on second control data included in the data signal.

18 Claims, 21 Drawing Sheets

(56) References Cited

U.S. PATENT DOCUMENTS

| | | |
|---|---|---|
| 2009/0168399 A1 | 7/2009 | Kim et al. |
| 2010/0013395 A1 | 1/2010 | Archibald et al. |
| 2011/0084956 A1 | 4/2011 | Choi et al. |
| 2012/0119653 A1 | 5/2012 | Bianco et al. |
| 2021/0364861 A1* | 11/2021 | Lum .................... H05B 47/105 |

* cited by examiner

BACKLIGHT SYSTEM

CROSS-REFERENCE TO RELATED APPLICATION(S)

A claim of priority under 35 U.S.C. § 119 is made to Korean Patent Application No. 10-2021-0185925 filed on Dec. 23, 2021 in the Korean Intellectual Property Office, the entirety of which is hereby incorporated by reference.

BACKGROUND

The present disclosure relates to backlight systems.

Backlight systems may be employed as a light source in display devices such as liquid crystal displays, and may include a light emitting diode (LED) as a light source. To increase a contrast ratio of a display device and to improve image quality, a portion of a plurality of LEDs included in a backlight system may be driven independently of each other. To independently drive at least a portion of the plurality of LEDs, a plurality of pixel integrated circuits (ICs) for driving two or more LEDs may be disposed in the backlight system. Each of the plurality of pixel ICs may operate based on power and data output by a separate driver IC.

SUMMARY

Embodiments of the inventive concepts provide a backlight system in which, by changing an order of driving LEDs by each of a plurality of pixel ICs if necessary, the plurality of pixel ICs may be disposed freely, which may improve a degree of freedom in design.

Embodiment of the inventive concepts provide a backlight system that includes a plurality of pixel ICs respectively including a plurality of channels connected to a plurality of LEDs and that control the plurality of LEDs to be turned on and off through the plurality of channels; and a driver IC connected to the plurality of pixel ICs and that supply a data signal to each of the plurality of pixel ICs. The plurality of pixel ICs include a first pixel IC connected to a plurality of first LEDs from among the plurality of LEDs and a second pixel IC connected to a plurality of second LEDs from among the plurality of LEDs. The first pixel IC turns the plurality of first LEDs on or off in a first order based on first control data included in the data signal, and the second pixel IC is configured to turn the plurality of second LEDs on or off in a second order different from the first order based on second control data included in the data signal.

Embodiments of the inventive concepts further provide a backlight system that includes a circuit board; a driver IC that outputs a data signal including a plurality of pieces of control data; and a plurality of pixel ICs that control a plurality of LEDs to be turned on and off, the plurality of pixel ICs connected to each other in series on the circuit board. The plurality of pixel ICs include a lead pixel IC directly connected to the driver IC, a plurality of intermediate pixel ICs connected to the lead pixel IC, and a last pixel IC connected to the plurality of intermediate pixel ICs. Each of the plurality of intermediate pixel ICs is connected between a first neighboring pixel IC and a second neighboring pixel IC, receives the data signal from the first neighboring pixel IC, and outputs the data signal to the second neighboring pixel IC. At least one of the plurality of intermediate pixel ICs is adjacent to the first neighboring pixel IC in a first direction and is adjacent to the second neighboring pixel IC in a second direction intersecting the first direction.

Embodiments of the inventive concepts provide a backlight system that includes a circuit board; a plurality of pixel ICs mounted on the circuit board, and connected to each other in series by wirings formed on the circuit board, each of the plurality of pixel ICs connected to a plurality of LEDs; and a driver IC that supplies a data signal to the plurality of pixel ICs. The plurality of pixel ICs includes a first pixel IC, a second pixel IC, and a third pixel IC, and a data signal input terminal of the second pixel IC is directly connected to a data signal output terminal of the first pixel IC by one of the wirings, and the data signal output terminal of the second pixel IC is connected to the data signal input terminal of the third pixel IC by another one of the wirings. An amount of data of the data signal transmitted between the data signal output terminal of the first pixel IC and the data signal input terminal of the second pixel IC is different from an amount of data of the data signal transmitted between the data signal output terminal of the second pixel IC and the data signal input terminal of the third pixel IC.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Hereinafter, embodiments of the present disclosure will be described as follows with reference to the accompanying drawings. As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1A:
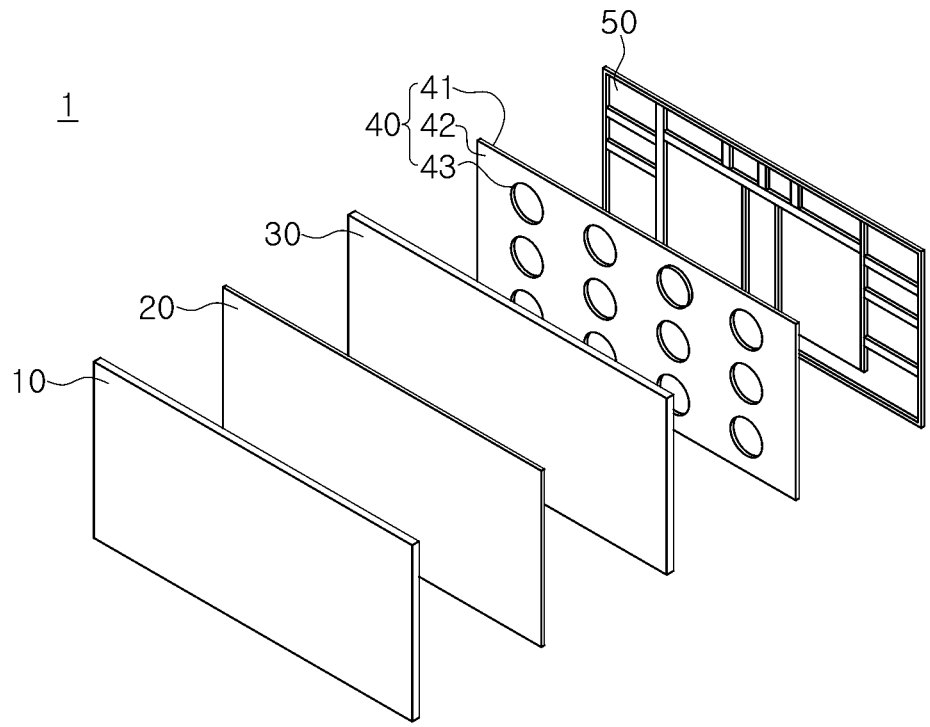
FIGS. 1A and 1B respectively illustrate diagrams of the layers and a side view of a backlight system according to embodiments of the inventive concepts.
Figure 1B:
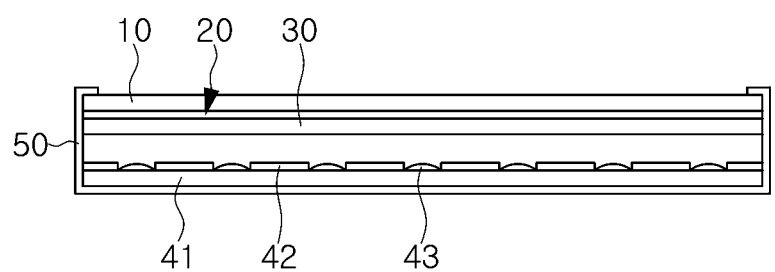

FIGS. 1A and 1B respectively illustrate diagrams of the layers and a side view of a backlight system according to embodiments of the inventive concepts.

Referring to FIGS. 1A and 1B, a display device 1 may include a display panel 10, an optical sheet 20, a diffusion sheet 30, a backlight system 40, and a housing 50. Hereinafter, the display device 1 in the example embodiment illustrated in FIGS. 1A and 1B and also in other example embodiments may be implemented as a device processing an image signal received from an external entity and visually displaying the processed image, and may be implemented as, for example, a television, a monitor, a portable multimedia device, a portable communication device, and the like, and is not limited to any particular device as long as the device is able to visually display an image.

The housing 50 may include the display panel 10, the optical sheet 20, the diffusion sheet 30 and the backlight system 40 accommodated therein. At a front surface of the housing 50, the front surface of the display panel 10 displaying an image may be exposed externally.

The display panel 10 may display various images in response to an image signal input from an external entity, and in some embodiments may be configured as a liquid crystal display (LCD) panel. The display panel 10 may not emit light by itself, and may display an image using light output by the backlight system 40.

For example, the display panel 10 may include a color filter substrate having a color filter and a black matrix, and a circuit board including a plurality of transistors, and a space between the circuit board and the color filter substrate may be filled with liquid crystal. For example, the circuit board may include a plurality of transistors providing a pixel circuit for each of the pixels of the display device 1.

The diffusion sheet 30 may have substantially the same size as that of the display panel 10, and may be formed of a material having excellent light transmittance. For example, the diffusion sheet 30 may be formed of a transparent plastic such as polymethyl methacrylate (PMMA), polycarbonate (PC), or the like. The diffusion sheet 30 may uniformly diffuse light output by the backlight system 40 and may transmit light to the optical sheet 20 and the display panel 10, thereby expanding a viewing angle of the display device 1 and alleviating bright spots, bright lines, spots, and the like.

The optical sheet 20 may be disposed between the display panel 10 and the diffusion sheet 20. The optical sheet 20 may reduce wasted light using refraction and light reflection, and may improve brightness of light entering from the diffusion sheet 30 and may allow light to be evenly distributed. In an example embodiment, the optical sheet 20 may include at least one of a prism sheet, a protective sheet, a double bright enhancement film (DBEF), and a quantum dot sheet.

In some embodiments, the prism sheet and the double brightness enhancement film may increase brightness by refracting or condensing light diffused through the diffusion sheet 30, and the protective sheet may protect the diffusion sheet 30, the prism sheet, and the double brightness enhancement film, and the components disposed in display device 1, from external impacts or foreign substances. A quantum dot sheet may include quantum dots (QD) absorbing light in various wavelength bands and scattering light in a desired wavelength band. For example, the quantum dots may be inorganic crystalline materials or microholes of several tens of nanometers (nm) or less.

The backlight system 40 may include a circuit board 41, a reflective sheet 42, and a plurality of light sources 43. Referring to FIG. 1A, the circuit board 41 is illustrated in a rectangular plate shape, but the shape is not limited to the example.

A reflective sheet 42 may be attached to an upper surface of the circuit board 41, and the reflective sheet 42 may be attached to regions other than regions in which the plurality of light sources 43 are disposed. The reflective sheet 42 may include at least one of photo solder resist (PSR), polyester terephthalate (PET), polycarbonate (PC), and polyester to have high reflectivity.

Each of the plurality of light sources 43 may include at least one pixel integrated circuit (IC), and a plurality of LEDs connected to the pixel IC. A driver IC for driving a plurality of pixel ICs may be mounted on the circuit board 41 of the backlight system 40, and the driver IC may be mounted on the same or opposite surface of the plurality of pixel ICs. A plurality of pixel ICs may operate by a power signal and a data signal output by the driver IC. The plurality of pixel ICs may operate independently of each other, and the backlight system 40 may provide a local dimming function for outputting light of different brightness in a portion of regions.

In an example embodiment, a plurality of pixel ICs connected to a driver IC may be connected to each other in series. For example, when the first to Nth pixel ICs are connected to a driver IC, the first pixel IC may directly receive a data signal from the driver IC, and remaining pixel ICs may receive a data signal output by the driver IC through at least one of the remaining pixel ICs. Accordingly, each of the plurality of pixel ICs may include a signal intermediary function for transferring the received data signal to the subsequent pixel IC.

In other words, the pixel ICs other than a lead pixel IC directly connected to the driver IC among the plurality of pixel ICs may operate by receiving data signals from the remaining pixel ICs. Also, among the remaining pixel ICs, the last pixel IC of the series connection receiving the data signal output by the driver IC may not output the data signal to other pixel ICs.

In an example embodiment, a plurality of LEDs may be turned on or turned off according to a driving order in which each of the plurality of pixel ICs is independently determined regardless of the form and the position in which the plurality of pixel ICs are disposed, and a structure connected to each other, and the like. To this end, the driver IC may generate and output a data signal including control data for designating a driving order for each of the plurality of pixel ICs.

Each of the plurality of pixel ICs may store control data corresponding to an identification number thereof when receiving a data signal, and each of the plurality of pixel ICs may control the plurality of LEDs according to the stored control data. For example, the control data may include control information indicating brightness and turn-on time of each of the plurality of LEDs, in addition to the driving order of the plurality of LEDs. Alternatively, a separate identification number may not be included in the data signal. In this case, each of the plurality of pixel ICs may select control data included in the data signal based on the order of receiving the data signal.

Figure 2A:
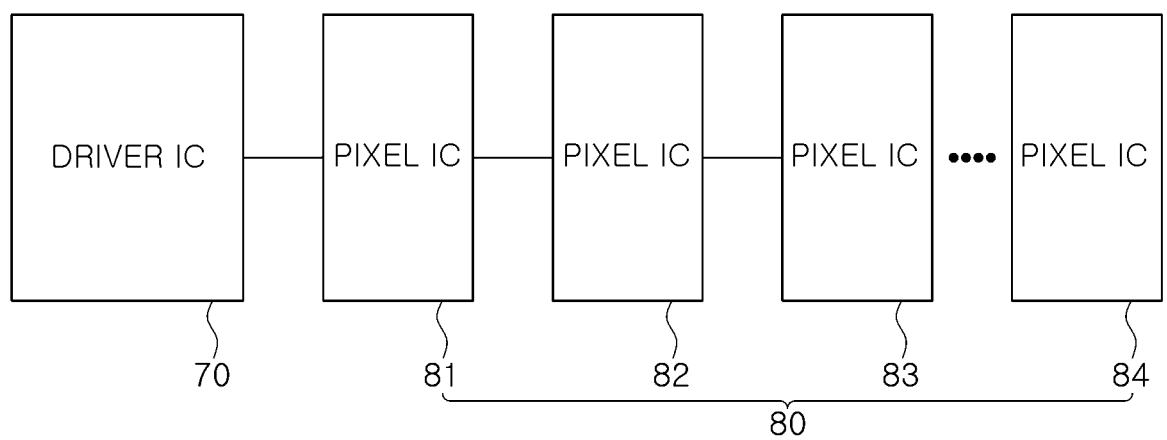
FIG. 2A illustrates a block diagram of a backlight system according to an embodiment of the inventive concepts.
Figure 2B:
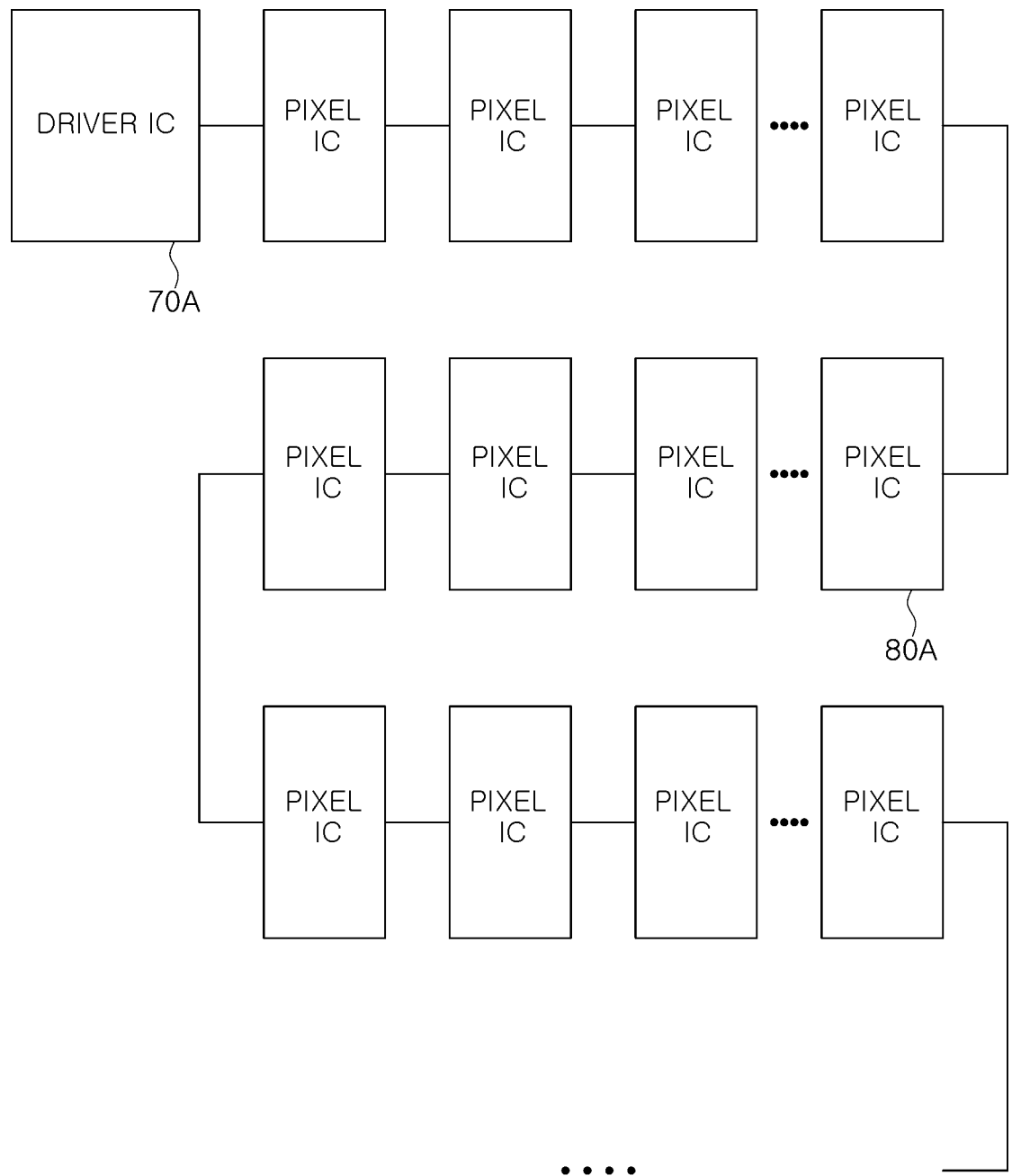
FIG. 2B illustrates a block diagram of a backlight system according to an embodiment of the inventive concepts.
Figure 2C:
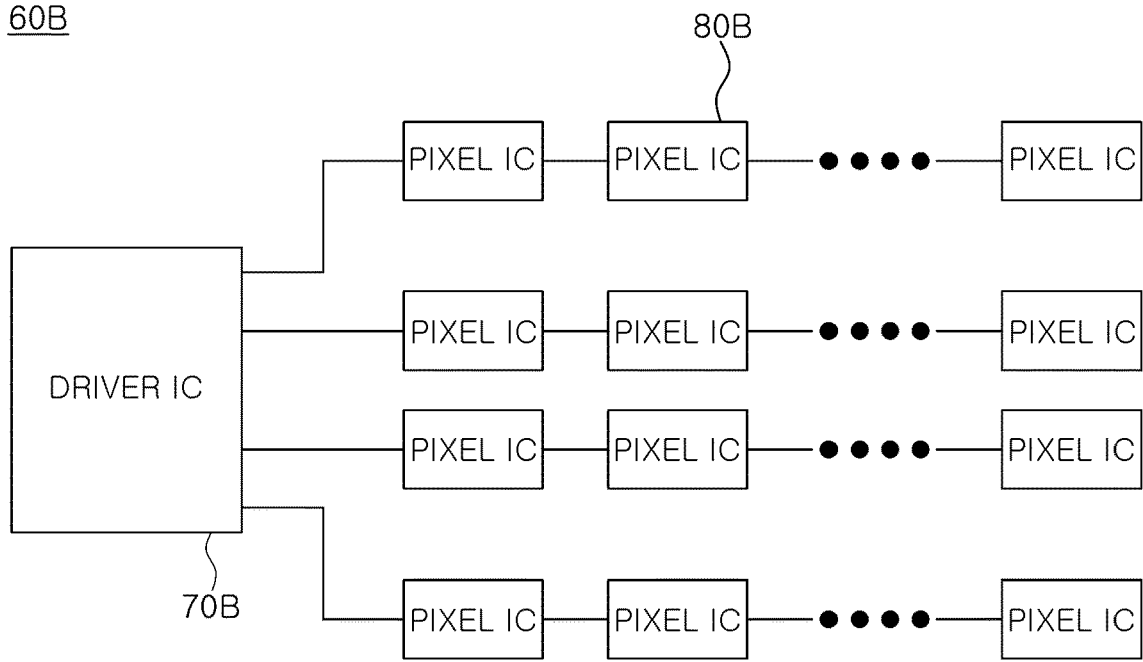
FIG. 2C illustrates a block diagram of a backlight system according to an embodiment of the inventive concepts.

FIGS. 2A to 2C illustrate block diagrams of backlight systems according to embodiments of the inventive concepts.

Referring first to FIG. 2A, a backlight system 60 in an example embodiment may include a driver IC 70 and a plurality of pixel ICs 80 connected to the driver IC 70. The plurality of pixel ICs 80 may be connected to each other in series. Each of the plurality of pixel ICs 80 may drive two or more LEDs. In an example embodiment, each of the plurality of pixel ICs 80 may drive the same number of LEDs, or at least a portion of the plurality of pixel ICs 80 may drive different numbers of LEDs.

The driver IC 70 may generate a power signal necessary for operation of the plurality of pixel ICs 80 and LEDs using an external power source, such as, for example, commercial AC power. For example, the driver IC 70 may include a power supply circuit such as switched-mode power supply (SMPS) or a regulator generating a power voltage required for operation of the plurality of pixel ICs 80, and may include a converter circuit outputting a constant current required for operation of the plurality of LEDs. However, in an example embodiment, the power supply voltage required for operation of the plurality of pixel ICs 80 may be supplied from a separate power management integrated circuit (PMIC) instead of the driver IC 70.

Also, the driver IC 70 may include a data circuit (see FIG. 3) for generating and outputting a data signal for controlling the operation of each of the plurality of pixel ICs 80. The data signal may include an identification number of each of the plurality of pixel ICs 80 and control data for controlling an operation of each of the plurality of pixel ICs 80. Each of the plurality of pixel ICs 80 may store control data corresponding to an identification number thereof, and may output a data signal including the remaining control data and identification numbers to other of the plurality of pixel ICs 80. Accordingly, magnitudes of the data signals received by the plurality of pixel ICs 80 may be different.

The driver IC 70 may output a data signal to a lead pixel IC. For example, the lead pixel IC may be a pixel IC 81 directly connected to the driver IC 70 among the plurality of pixel ICs 80. The lead pixel IC 81 may select and store control data thereof (i.e., control data for the lead pixel IC 81) from the received data signal, and may output the remaining data signal to the subsequent pixel IC 82. For example, the lead pixel IC 81 may select control data corresponding to the respective lead pixel IC 81 from the data signal based on the identification information, or may select first control data from the control data included in the data signal without reference to the identification information. The subsequent pixel IC 82 may select and store control data thereof from the remaining data signal output from the lead pixel IC 81, and may in turn output a corresponding remaining data signal for pixel ICs 83 and 84 to pixel IC 83.

The last pixel IC 84 receiving the data signal output by the driver IC 70 last may not output the data signal to a subsequent pixel IC. For example, the last pixel IC may have the same structure as that of the remaining pixel ICs, and a data signal output terminal for outputting a data signal may be terminated.

Referring to FIG. 2B, the backlight system 60A in an example embodiment may include a driver IC 70A and a plurality of pixel ICs 80A. In the example embodiment illustrated in FIG. 2B, the plurality of pixel ICs 80A may be disposed in a meandering form, and an operation method may be similar to the example described in the aforementioned example embodiment with reference to FIG. 2A.

Each of the plurality of pixel ICs 80A may control two or more LEDs. In an embodiment, each of the plurality of pixel ICs 80A may include a plurality of channels connected to two or more LEDs, and a driving order of turning on two or more LEDs may be determined according to a driving order defined in control data received from the driver IC 70A.

For example, at least a portion of the plurality of pixel ICs 80A may turn on two or more LEDs in a different order. For example, in the example embodiment illustrated in FIG. 2B, pixel ICs disposed in different rows among the plurality of pixel ICs 80A may turn on the LEDs in a different order. Accordingly, regardless of the arrangement of the plurality of pixel ICs 80A, each of the plurality of pixel ICs 80A may drive the LEDs in an order optimized for a user of a display device equipped with the backlight system 60A, and the degree of freedom in designing the backlight system 60A may improve.

Referring to FIG. 2C, the backlight system 60B in an example embodiment may include a driver IC 70B and a plurality of pixel ICs 80B. In the example embodiment illustrated in FIG. 2C, the plurality of pixel ICs 80B connected to the driver IC 70B may be divided into a plurality of groups. For example, the groups may be arranged in a vertical direction, and a plurality of pixel ICs 80B in each group may be arranged in a horizontal direction. The groups of the plurality of pixel ICs may be grouped in rows.

The driver IC 70B may separately generate and output a data signal for each group. For example, a first data signal output by the driver IC 70B may be input to a group disposed in a first row, and a second data signal may be input to a group disposed in a second row. Each of the plurality of groups may be mounted on a separate circuit board or mounted together on one circuit board.

In the example embodiments described with reference to FIGS. 2A to 2C, the plurality of pixel ICs 80, 80A, and 80B may receive control data at different times according to the order of being connected from the driver ICs 70, 70A, and 70B. In an example embodiment, the plurality of pixel ICs 80, 80A, and 80B may turn on the LEDs immediately after receiving the control data. Alternatively, in another example embodiment, the plurality of pixel ICs 80, 80A, and 80B may simultaneously start the operation of turning on the LEDs after the last pixel IC finally receives the control data.

Figure 3:
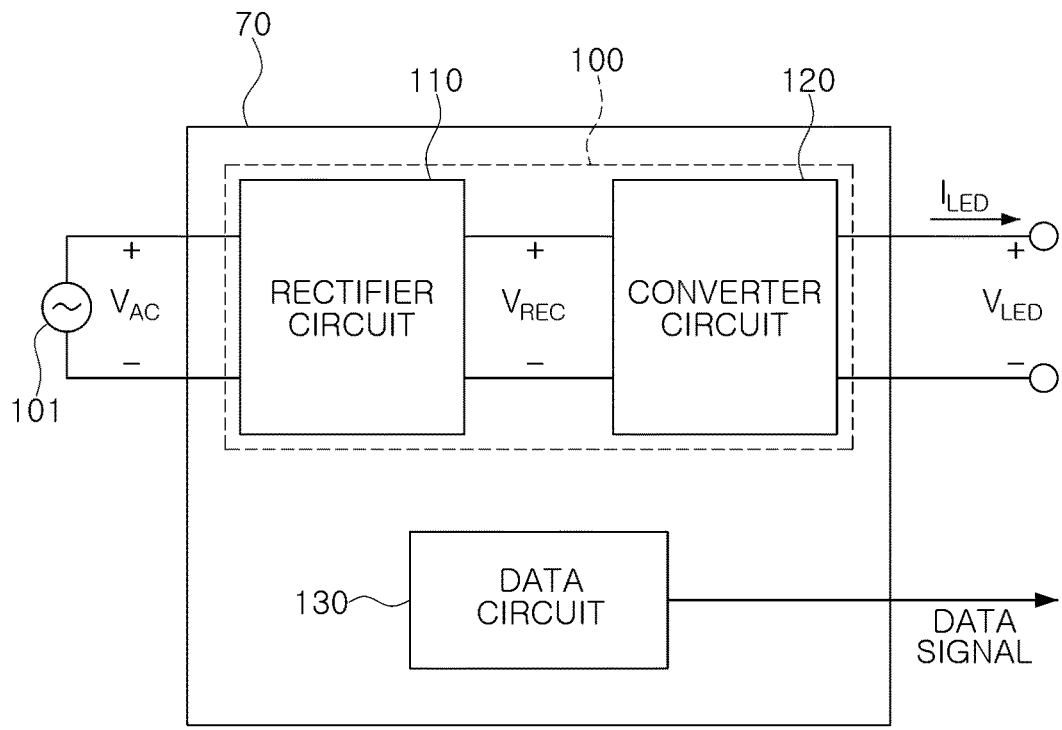
FIG. 3 illustrates a block diagram of a driver IC of a backlight system including a power circuit and a data circuit according to embodiments of the inventive concepts.

FIG. 3 illustrates a block diagram of a driver IC of a backlight system according to embodiments of the inventive concepts.

Referring to FIG. 3, the driver IC 70 of the backlight system in an example embodiment may include a power supply circuit 100 and a data circuit 130. The power supply circuit 100 may include a rectifier circuit 110 and a converter circuit 120. The power circuit 100 in example embodiments illustrated in FIG. 3 may output an LED voltage $V_{LED}$ and an LED current $I_{LED}$ required for driving a plurality of LEDs, and for example, the LED current $I_{LED}$ may be a constant current.

The rectifier circuit 110 may rectify the AC voltage $V_{Ac}$ output by the commercial AC power supply 101 and may output the rectified voltage $V_{REC}$. For example, the rectifier circuit 110 may include a diode bridge circuit.

The converter circuit 120 may output the LED voltage $V_{LED}$ and the LED current $I_{LED}$ using the rectified voltage $V_{REC}$. In an example embodiment, the converter circuit 120 may include a PFC converter, a buck converter, and a buck-boost converter, and may include at least one switch element. For example, by adjusting the turn-on and turn-off times of the switch elements included in the converter circuit 120, the magnitudes of the LED voltage $V_{LED}$ and the LED current $I_{LED}$ may be adjusted.

The LED voltage $V_{LED}$ and the LED current $I_{LED}$ may be output to a plurality of pixel ICs connected to the driver IC. Each of the plurality of pixel ICs may drive the plurality of LEDs using the LED voltage $V_{LED}$ and the LED current $I_{LED}$. For example, the driver IC may further include a control circuit outputting a data signal in addition to the power circuit 100, and brightness of the plurality of LEDs connected to the plurality of pixel ICs, respectively, may be determined by the data signal output to the plurality of pixel ICs by the control circuit. In example embodiments, a plurality of pixel ICs which may supplied with the LED voltage $V_{LED}$ and the LED current $I_{LED}$ in common may differently control brightness of the LEDs according to the data signal.

The data circuit 130 may receive data for controlling the pixel ICs from a controller of the display device on which the backlight system is mounted, and may generate the data signal including control data using the data.

Figure 4:
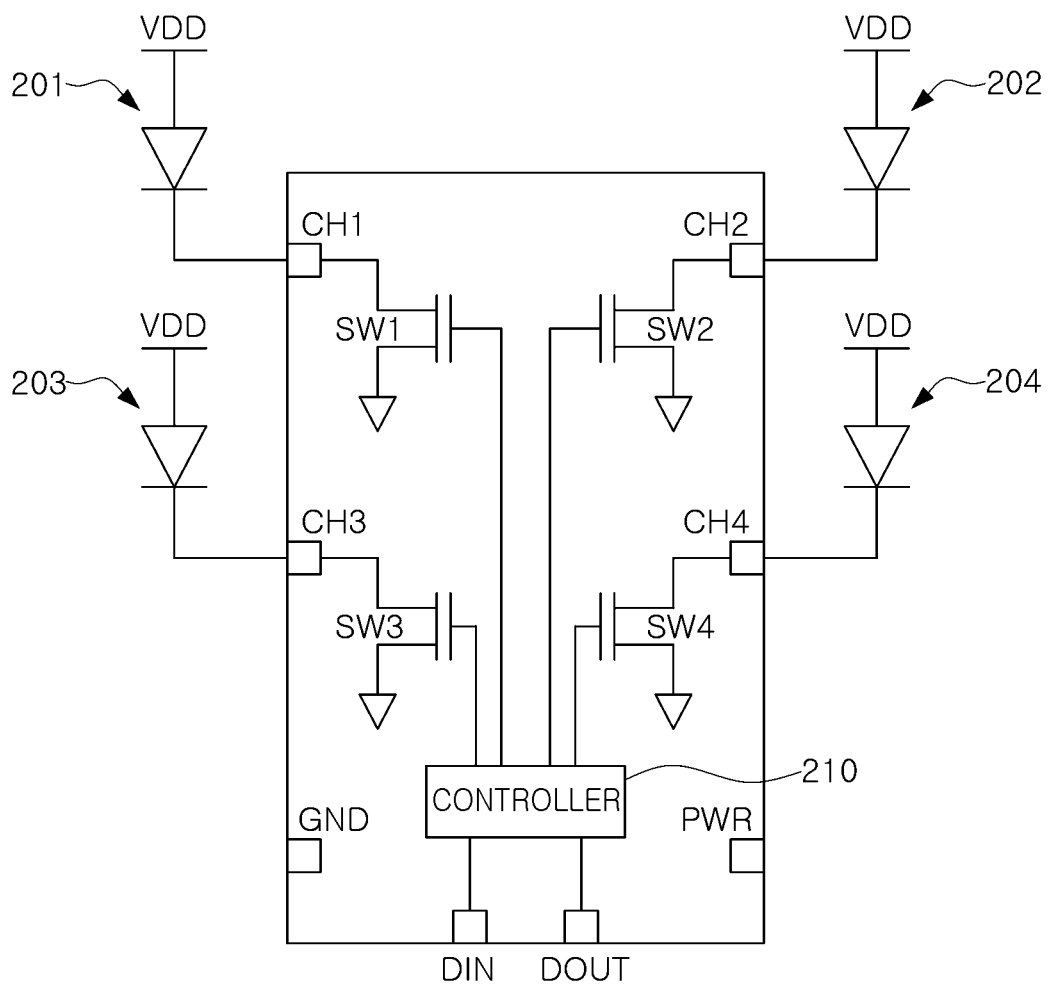
FIG. 4 illustrates a block diagram of a pixel IC in a backlight system according to embodiments of the inventive concepts.
Figure 5:
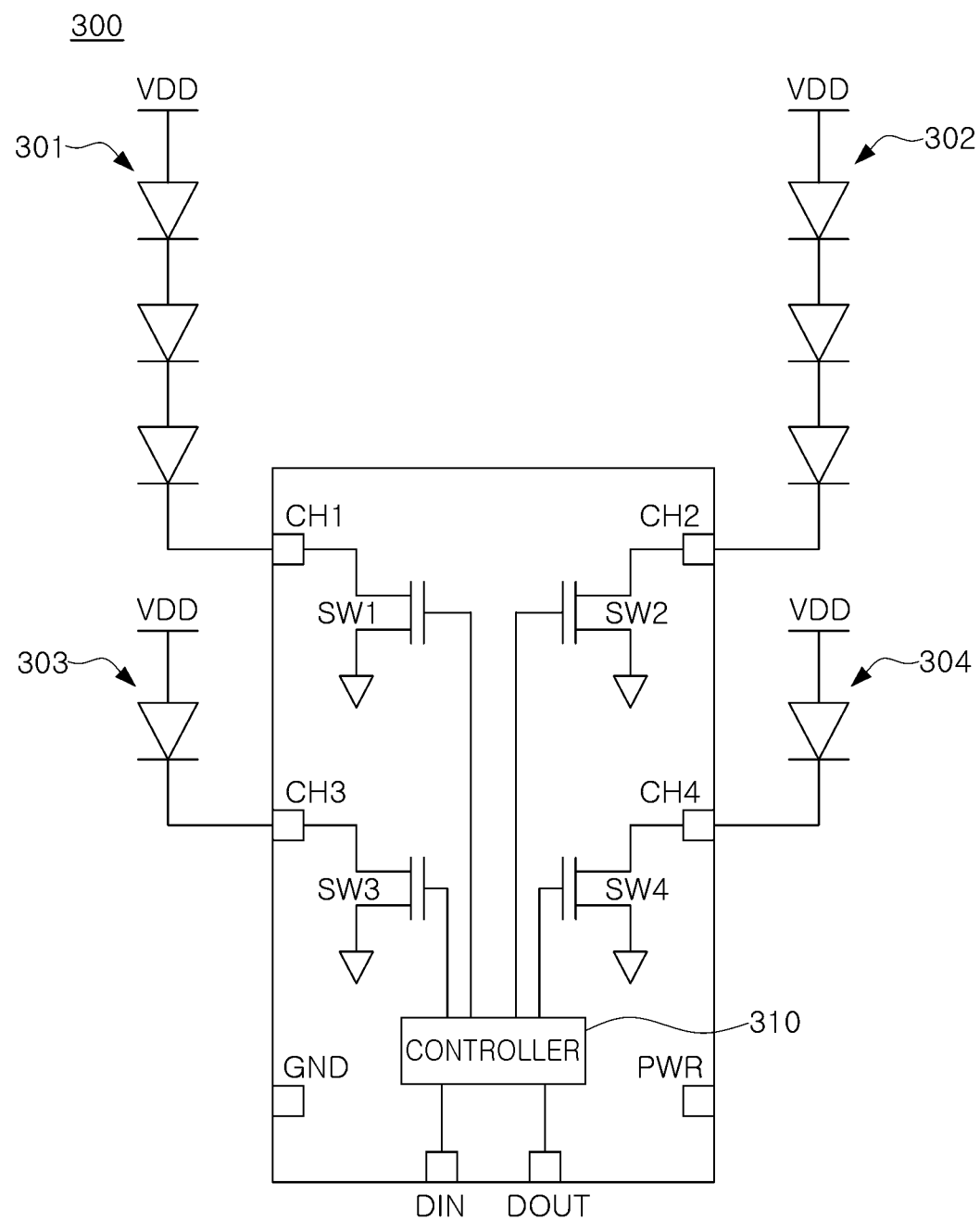
FIG. 5 illustrates a block diagram of a pixel IC in a backlight system according to embodiments of the inventive concepts.

FIGS. 4 and 5 illustrate diagrams of respective pixel ICs in backlight systems according to embodiments of the inventive concepts.

Referring first to FIG. 4, the pixel IC 200 in an example embodiment may be connected to a plurality of LEDs 201-204 through a plurality of channels CH1-CH4. The number of the plurality of LEDs 201-204 may be varied in example embodiments, and the number of the plurality of channels CH1-CH4 may also be varied in example embodiments.

The pixel IC 200 may further include power terminals PWR and GND and signal input/output terminals DIN and DOUT in addition to the plurality of channels CH1-CH4 to which the plurality of LEDs 201-204 are connected. The pixel IC 200 may receive a power voltage and a ground voltage from the driver IC through the power terminals PWR and GND. Also, the pixel IC 200 may receive a data signal from another pixel IC or a driver IC disposed previously through the data signal input terminal DIN, and may output the data signal to the subsequent pixel IC through the data signal output terminal DOUT. When the pixel IC 200 is the last pixel IC, the data signal output terminal DOUT may be terminated. In example embodiments, the number of terminals included in the pixel IC 200 and types of signals and voltages input through the terminals may be varied.

Referring to FIG. 4, each of the plurality of LEDs 201-204 may receive a driving voltage VDD. For example, the driving voltage VDD may be a voltage generated and supplied by the driver IC. In example embodiments, a node outputting the driving voltage VDD in the driver IC may be directly connected to the plurality of LEDs 201-204, or the pixel IC 200 may receive the driving voltage VDD and may supply the driving voltage VDD to the plurality of LEDs. Alternatively, the pixel IC 200 may generate the driving voltage VDD using a power voltage supplied to the power terminals PWR and GND.

In the example embodiment in FIG. 4, the plurality of channels CH1-CH4 connected to the output terminals of the plurality of LEDs 201-204 may be connected to the plurality of switch elements SW1-SW4. For example, each of the plurality of switch elements SW1-SW4 may be implemented as a transistor, and a control terminal determining turning on/off of each of the plurality of switch elements SW1-SW4 may be connected to the controller 210. The controller 210 may be connected to a data signal input terminal DIN and a data signal output terminal DOUT. In an example embodiment, a power voltage required for operation of the controller 210 may be supplied through the power terminals PWR and GND.

The controller 210 may find (i.e., determine) and store control data corresponding to identification information of the pixel IC 200 in the data signal received through the data signal input terminal DIN, and may control turning on/off of each of the plurality of switch elements SW1-SW4 based on the control data. For example, the control data may include information necessary to determine a magnitude, a waveform, a frequency, and a duty ratio of a signal input to a control terminal of each of the plurality of switch elements SW1-SW4. The controller 210 may output a PWM signal to a control terminal of each of the plurality of switch elements SW1-SW4, and a frequency and a duty ratio of the PWM signal may be varied depending on control data.

In the example embodiment illustrated in FIG. 4, each of the plurality of channels CH1-CH4 may be connected to one of the plurality of switch elements SW1-SW4, and the operation of the plurality of LEDs 201-204 may be individually controlled. For example, a portion of the plurality of LEDs 201-204 (i.e., one or more) may be turned on and the remaining other may be turned off, or a portion of the plurality of LEDs 201-204 may be turned on with a first brightness and the remaining others may be turned on with a second brightness different from the first brightness. Also, after each of the plurality of LEDs 201-204 is turned on, brightness may be individually adjusted.

In the example embodiment in FIG. 4, the same number of LEDs 201-204 may be connected to each of the plurality of channels CH1-CH4. Differently from this example embodiment, in the example embodiment illustrated in FIG. 5, a different number of LEDs 301-304 may be connected to a portion of the plurality of channels CH1-CH4. Referring to FIG. 5, three first LEDs 301 may be connected to a first channel CHL and three second LEDs 302 may be connected to a second channel CH2. The LEDs 303 and 304 may be connected to the third channel CH3 and the fourth channel CH4, respectively.

The number of the LEDs 301-304 connected to the plurality of channels CH1-CH4, respectively, and the connection structure of the LEDs 301-304 may be varied differently from the examples illustrated in FIG. 5. For example, four or more LEDs may be connected to at least one of the plurality of channels CH1-CH4, or a plurality of LEDs may be connected to one of the plurality of channels CH1-CH4 in parallel. The number of the LEDs connected to the plurality of channels CH1-CH4 and the connection structure of the LEDs may be varied depending on brightness and color of light to be implemented by each pixel IC 300.

In the example embodiments described with reference to FIGS. 4 and 5, the plurality of LEDs 201-204 and 301-304 may output light of the same color. For example, the plurality of LEDs 201-204 and 301-304 may output white light. However, in example embodiments, at least a portion of the plurality of LEDs 201-204 and 301-304 connected to the pixel IC 200 and 300 may output light of different colors.

Figure 6:
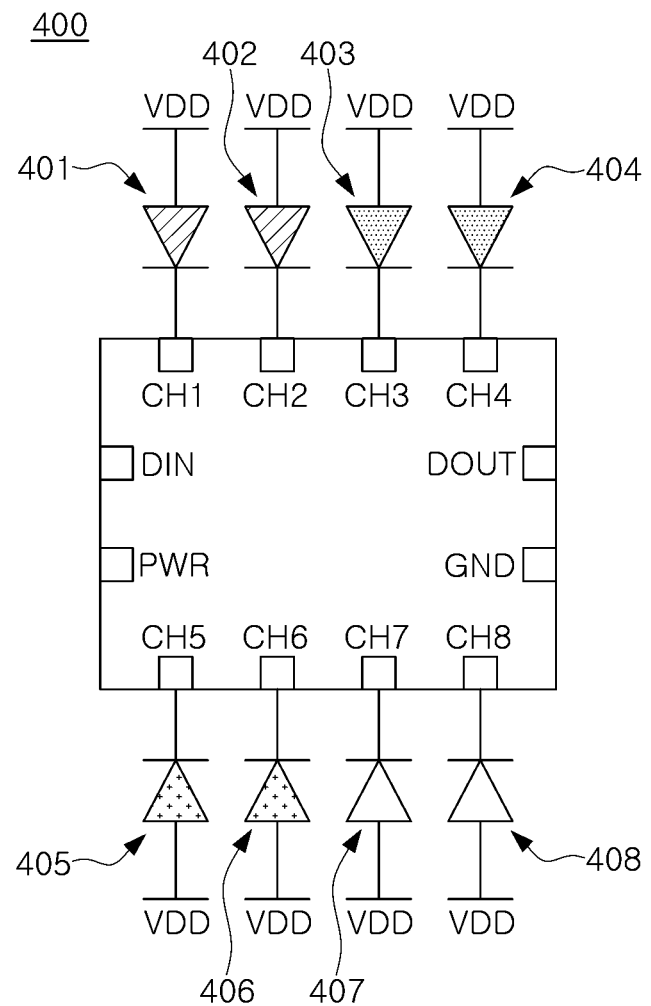
FIG. 6 illustrates a block diagram of a pixel IC included in a backlight system according to embodiments of the inventive concepts.

FIG. 6 illustrates a diagram of a pixel IC included in a backlight system according to embodiments of the inventive concepts.

Referring to FIG. 6, the pixel IC 400 in an example embodiment may be connected to a plurality of LEDs 401-408 through a plurality of channels CH1-CH8. The pixel IC 400 may further include power terminals PWR and GND, and signal input/output terminals DIN and DOUT in addition to the plurality of channels CH1-CH8 connected to the plurality of LEDs 401-408. The configuration and arrangement of the power terminals PWR and GND and the signal input/output terminals DIN and DOUT may be similar to the example embodiments described in the with reference to FIGS. 4 and 5.

The connection structure of the plurality of LEDs 401-408 and the pixel IC 400 is not necessarily limited to the example illustrated in FIG. 6. For example, in the example embodiment in FIG. 6, the plurality of LEDs 401-408 may be connected to both sides of the pixel IC 400 in a divided manner, or the entirety of the plurality of LEDs 401-408 may be connected to one side of the pixel IC 400. Alternatively, a plurality of LEDs 401-408 may be connected to three or more of the corners of the pixel IC 400 in a distributed manner. The number of the plurality of LEDs 401-408 may also be varied if desired.

In the example embodiment illustrated in FIG. 6, the pixel IC 400 may be connected to a plurality of LEDs 401-408 outputting light of various colors. For example, the first and second LEDs 401 and 402 may output red light, and the third and fourth LEDs 403 and 404 may output green light. The fifth and sixth LEDs 405 and 406 may output blue light, and the seventh and eighth LEDs 407 and 408 may output white light.

Accordingly, the pixel IC 400 in example embodiments illustrated in FIG. 6 may implemented to provide light of various colors by controlling each of the plurality of LEDs 401-408 to be turned on/off through the plurality of channels CH1-CH8. For example, by turning off the fifth and sixth LEDs 405 and 406 and turning on the first to fourth LEDs 401 to 404, light having a color close to yellow may be output. The pixel IC 400 may determine the color of light by controlling the turning on/off each of the first to sixth LEDs 401 to 406 and brightness thereof, and the pixel IC 400 may adjust overall brightness of light by controlling the turning on/off each of the seventh and eighth LEDs 407 and 408.

The internal structure of the pixel IC 400 may be similar to the aforementioned example embodiment with reference to FIGS. 4 and 5. For example, the pixel IC 400 may include a plurality of switch elements such as SW1-SW4 and a controller such as controller 310 (see FIGS. 4 and 5) controlling on/off of the plurality of switch elements, and the controller may be connected to the signal input/output terminals DIN and DOUT. In an example embodiment, the same number of switch elements as the number of channels CH1-CH8 may be included in the pixel IC 400. Alternatively, LEDs 401-408 of the same color may be connected to a single switch element. For example, a first switch element may be connected to the first and second channels CH1 and CH2 in common, a second switch element may be connected to the third and fourth channels CH3 and CH4 in common, and a third switch element may be connected to the fifth and sixth channels CH5 and CH6 in common. The seventh and eighth channels CH7 and CH8 may also be connected to a fourth switch element in common.

Also, as described in the aforementioned example embodiment with reference to FIG. 5, a different number of LEDs 401-408 may be connected to at least a portion of the plurality of channels CH1-CH8. For example, to increase maximum brightness provided by the pixel IC 400, a number of the LEDs 407 and 408 greater than the number of the remaining channels CH1-CH6 may be connected to at least one of the seventh and eighth channels CH7 and CH8.

A driving order of turning on or off the plurality of LEDs 401-408 through the plurality of channels CH1-CH8 in the pixel IC 400 may be varied depending on control data received through the data signal input terminal DIN by the controller of the pixel IC 400. For example, the pixel IC 400 may be mounted on a circuit board of the backlight system, and the direction in which the pixel IC 400 is mounted may be varied depending on a position thereof. For example, the pixel IC 400 in a first position may be mounted as in the example illustrated in FIG. 6, whereas the pixel IC 400 in a second position may be rotated by 180 degrees from the example illustrated in FIG. 6.

Under the above assumption, the pixel IC 400 in the first position may drive the plurality of LEDs 401-408 in order of the plurality of channels CH1-CH8. Accordingly, the first LED 401 to the fourth LED 404 may be turned on in order, and thereafter, the fifth LED 405 to the eighth LED 408 may be turned on in order.

The pixel IC 400 in the second position may drive the plurality of LEDs 401-408 in a different order. For example, in the pixel IC of the second position, the first to fourth LEDs 401-404 may be turned on in an order from the fourth LED 404 to the first LED 401, and the fifth to eighth LEDs 405-408 may be turned on in an order from the eighth LED toward the fifth LED 405.

In an example embodiment, as described above, the order in which the pixel IC 400 drives the plurality of channels CH1-CH8 may be controlled by the control data received through the data signal input terminal DIN. The control data may include data defining a driving order of the plurality of channels CH1-CH8. Accordingly, in the backlight system, the driving order of the pixel IC 400 may be determined as desired depending on the position in which the pixel IC 400 is mounted on the circuit board, and design freedom of the pixel IC 400 disposed on the circuit board may increase, and the backlight system may be easily manufactured.

Since the driving order of the plurality of channels CH1-CH8 is determined according to the control data, for example, the plurality of LEDs 401-408 connected to the plurality of channels CH1-CH8, respectively, may be simultaneously turned on. Also, the pixel IC 400 may, based on the control data, divide the plurality of channels CH1-CH8 into two or more groups, and may control the driving order of the LEDs 401-408 connected to the channels CH1-CH8 included in each of the two or more groups. For example, depending on the positions of the plurality of channels CH1-CH8, the first to fourth channels CH1-CH4 may be grouped into a first group, and the fifth to eighth channels CH5-CH8 may be grouped to a second group. Alternatively, the plurality of channels CH1-CH8 may be divided into four groups depending on the colors of the plurality of LEDs 401-408 connected to the plurality of channels CH1-CH8. In example embodiments, at least a portion of the groups may include different numbers of channels CH1-CH8.

In an example embodiment, the plurality of LEDs 401-408 connected to the plurality of channels CH1-CH8 in the pixel IC 400 may output light of the same color. For example, the plurality of LEDs 401-408 connected to a single pixel IC 400 may output cool white-based white light to improve sharpness of an image displayed by the display device.

Figure 7:
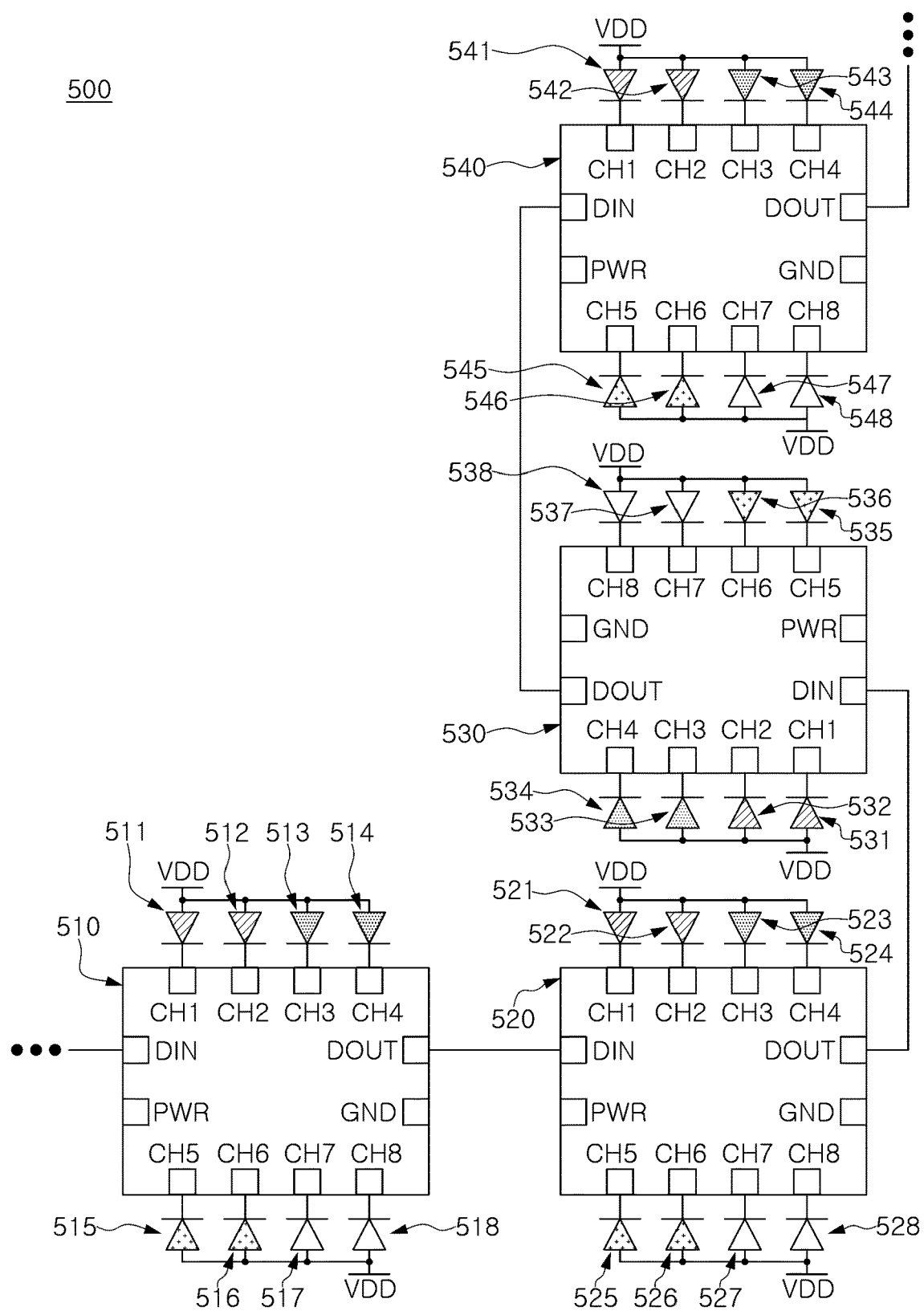
FIG. 7 illustrates a block diagram of a portion of pixel ICs included in a backlight system according to embodiments of the inventive concepts.
Figure 8:
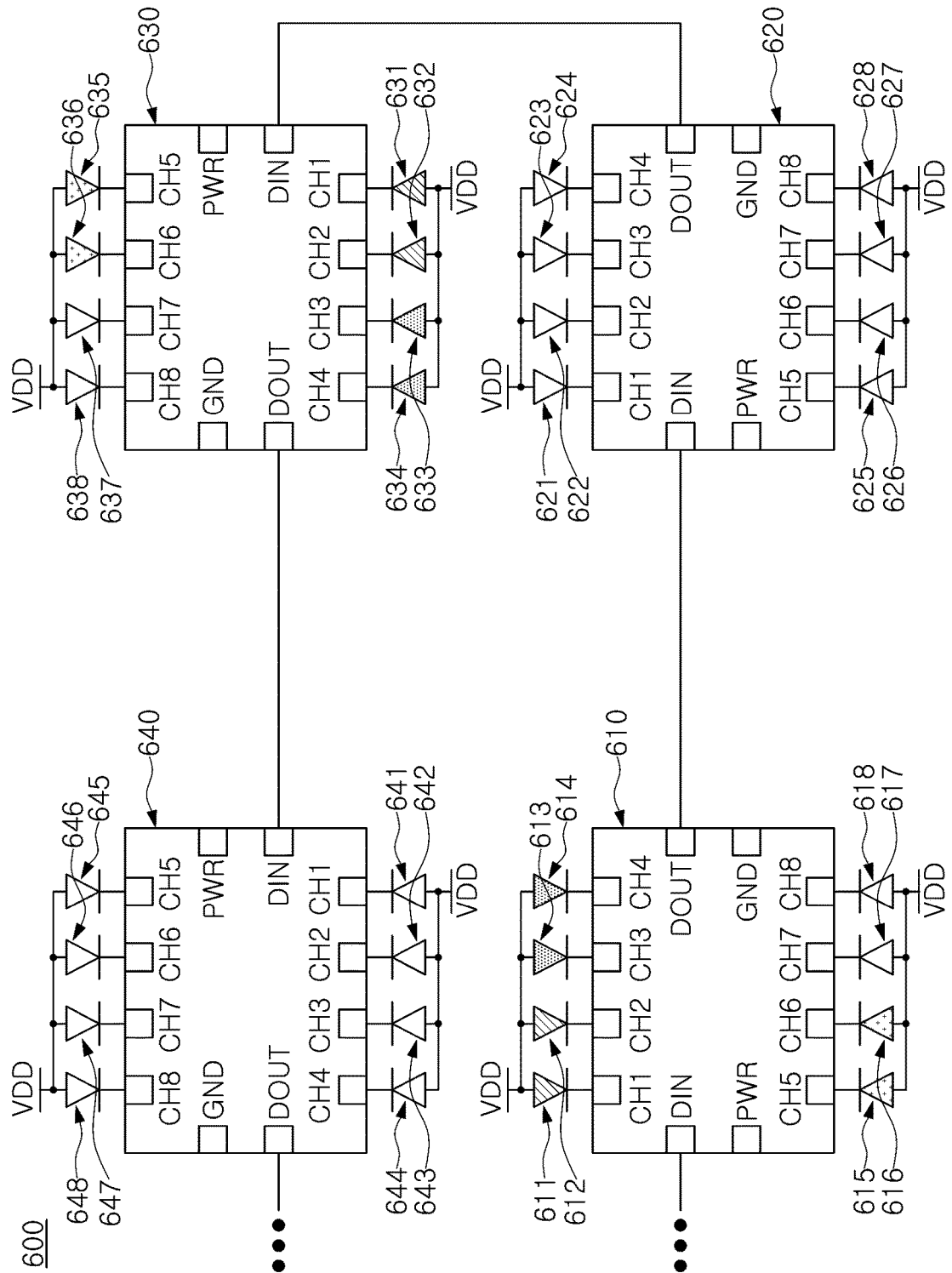
FIG. 8 illustrates a block diagram of a portion of pixel ICs included in a backlight system according to embodiments of the inventive concepts.

FIGS. 7 and 8 illustrate diagrams of a portion of pixel ICs included in a backlight system according to embodiments of the inventive concepts. The internal structure of the pixel ICs of FIGS. 7 and 8 may be similar to the embodiments of FIGS. 4 and 5 in that the pixel ICs may include corresponding switches SW and a controller that are not shown so as to simplify the drawings.

Referring to FIG. 7, the backlight system 500 in an example embodiment may include a plurality of pixel ICs 510-540. A configuration of each of the plurality of pixel ICs 510-540 may be similar to the example embodiment described with reference to FIG. 6. However, embodiments thereof are not limited thereto, and the shape of the plurality of pixel ICs 510-540 may be varied.

For example, the first pixel IC 510 may receive a data signal from the previous pixel IC or the driver IC through a data signal input terminal DIN, and may transmit the data signal to the second pixel IC 520, which is the subsequent pixel IC, through the data signal output terminal DOUT. The data signal received and transmitted by the first pixel IC 510 may include identification information of each of the pixel ICs 510-540 and control data of each of the pixel ICs 510-540.

When a data signal is received through the data signal input terminal DIN, the first pixel IC 510 may select and store control data corresponding to the identification information thereof from the data signal. That is, the first pixel IC 510 may store its own identification information. Also, the first pixel IC 510 may transmit identification information and control data other than the identification information thereof and control data corresponding thereto to the second pixel IC 520 through the data signal output terminal DOUT. Accordingly, a magnitude of the data signal received by the first pixel IC 510 through the data signal input terminal DIN may be greater than a magnitude of the data signal received by the second pixel IC 520 through the data signal input terminal DIN. For example, the amount of control data received by the first pixel IC 510 may be greater than the amount of control data received by the other pixel ICs 520-540.

However, each of the pixel ICs 510-540 may select control data without separate identification information. For example, the first pixel IC 510 may select the most advanced control data from the received data signal and may transmit the remaining control data to the second pixel IC 520. For example, the first pixel IC 510 may select the control data based on where it is located in the received data signal.

The first pixel IC 510 may include a plurality of channels CH1-CH8, and a plurality of LEDs 511-518 may be connected to the plurality of channels CH1-CH8. At least a portion of the plurality of LEDs 511-518 may output light of different colors. Accordingly, the first pixel IC 510 may implement light of various colors.

In the example embodiment illustrated in FIG. 7, the first pixel IC 510, the second pixel IC 520, and the fourth pixel IC 540 may be mounted in the same direction. For example, referring to FIG. 7, the first pixel IC 510, the second pixel IC 520, and the fourth pixel IC 540 may be mounted on the circuit board such that the first channel CH1 may be disposed at an upper left end of the corresponding pixel IC.

The third pixel IC 530 may be mounted in a different direction from the direction of the first pixel IC 510. Referring to FIG. 7, the third pixel IC 530 may be mounted on the circuit board such that the first channel CH1 may be disposed at a lower right end, which may be to efficiently connect the second pixel IC 520 to the third pixel IC 530 in consideration of the positions of the data signal input terminal DIN and the data signal output terminal DOUT in each of the plurality of pixel ICs 510-540.

In an example embodiment, each of the plurality of pixel ICs 510-540 may turn on the plurality of LEDs in the same direction while being mounted on the circuit board. For example, the first pixel IC 510 may turn on four LEDs 511-514 disposed on an upper end in a direction from the left side to the right side, and may turn on the remaining four LEDs 515-518 disposed on a lower end in the direction from the left side to the right side. Accordingly, in the first pixel IC 510, the first to eighth LEDs 511-518 may be turned on in order.

The direction in which the third pixel IC 530 turns on the plurality of LEDs 531-538 may be the same as the direction in which the first pixel IC 510 turns on the plurality of LEDs 511-518. Accordingly, the third pixel IC 530 may turn on the four LEDs 535-538 disposed on an upper end in the direction from the left side to the right side, and may turn on the remaining four LEDs 531-534 disposed on a lower end in the direction from the left side to the right side. Accordingly, in the third pixel IC 530, the first to eighth LEDs 531-538 may be turned on in the reverse order.

In an example embodiment, the driving order of each of the plurality of pixel ICs 510-540 may be varied depending on control data. For example, depending on the driving order of each of the plurality of pixel ICs 510-540 of the plurality of channels CH1-CH8, individual control data for each of the plurality of channels CH1-CH8 may be aligned in the control data. In the above example, the first control data which the first pixel IC 510 selects from the data signal and stores and the third data which the third pixel IC 530 selects from the data signal and stores may instruct different driving orders.

For example, assuming that each of the plurality of pixel ICs 510-540 turns on only the LEDs connected to the first to sixth channels CH1-CH6, the plurality of pixel ICs control data received and stored by each of the 510-540 may be represented as in Table 1 below, wherein the identification numbers 1-4 respectively correspond to the pixel ICs 510, 520, 530 and 540.

TABLE 1

| Identification No. | First turn-on | Second turn-on | Third turn-on | Fourth turn-on | Fifth turn-on | Sixth turn-on | Seventh turn-on | Eighth turn-on |
|---|---|---|---|---|---|---|---|---|
| 1 | CH1 | CH2 | CH3 | CH4 | CH5 | CH6 | — | — |
| 2 | CH1 | CH2 | CH3 | CH4 | CH5 | CH6 | — | — |
| 3 | — | — | CH6 | CH5 | CH4 | CH3 | CH2 | CH1 |
| 4 | CH1 | CH2 | CH3 | CH4 | CH5 | CH6 | — | — |

In an embodiment where the entirety of the plurality of LEDs connected to the plurality of pixel ICs 510-540 in FIG. 7, respectively, output light of the same color, each piece of data received and stored by each of the plurality of pixel ICs 510-540 may be defined as in Table 2.

TABLE 2

| Identification No. | First turn-on | Second turn-on | Third turn-on | Fourth turn-on | Fifth turn-on | Sixth turn-on | Seventh turn-on | Eighth turn-on |
|---|---|---|---|---|---|---|---|---|
| 1 | CH1 | CH2 | CH3 | CH4 | CH5 | CH6 | — | — |
| 2 | CH1 | CH2 | CH3 | CH4 | CH5 | CH6 | — | — |
| 3 | CH8 | CH7 | CH6 | CH5 | CH4 | CH3 | — | — |
| 4 | CH1 | CH2 | CH3 | CH4 | CH5 | CH6 | — | — |

For example, in the example embodiment illustrated in FIG. 7, the plurality of pixel ICs 510 to 540 may be intermediate pixel ICs, different from a lead pixel IC directly connected to the driver IC or a last pixel IC which receives a data signal output by the driver IC last. Accordingly, each of the plurality of pixel ICs 510-540 may be connected to a first neighboring pixel IC and a second neighboring pixel IC, may receive a data signal from the first neighboring pixel IC, and may output the data signal to the second neighboring pixel IC. For example, the first neighboring pixel IC for the second pixel IC 520 may be the first pixel IC 510, and the second neighboring pixel IC may be the third pixel IC 530.

As illustrated in FIG. 7, at least one of the intermediate pixel ICs may be adjacent to the first neighboring pixel IC in a first direction, and may be adjacent to the second neighboring pixel IC in a second direction intersecting the first direction. Referring to FIG. 7, the second pixel IC 520 may be adjacent to the first pixel IC 510 which is the first neighboring pixel IC in the first direction (the horizontal direction), and may be adjacent to the third pixel IC 530 which is the second neighboring pixel IC in the second direction (the vertical direction). The intersecting first and second directions may be perpendicular to each other.

Referring to FIG. 8, the backlight system 600 in an example embodiment may include a plurality of pixel ICs 610 to 640. At least a portion of the plurality of pixel ICs 610 to 640 may have different configurations. For example, each of the first and third pixel ICs 610 and 630 may be connected to LEDs outputting light of different colors. Differently from the embodiment described with respect to FIG. 7, each of the second and fourth pixel ICs 620 and 640 in FIG. 8 may be connected to LEDs emitting light of one color. Also, in example embodiments, LEDs connected to each of the plurality of pixel ICs 610 to 640 may output light of the same color.

In the example embodiment illustrated in FIG. 8, first and second pixel ICs 610 and 620 disposed in a first row, and third and fourth pixel ICs 630 and 640 arranged in a second row may be rotated 180 degrees with respect to first and second pixel ICs 610 and 620, and may be mounted on the circuit board. Referring to FIG. 8, the first pixel IC 610 may be mounted on the circuit board such that the first channel CH1 may be disposed at an upper left end, whereas the third pixel IC 630 may be mounted on the circuit board such that the first channel CH1 may be disposed at a lower right end.

In an example embodiment, the driving order of each of the plurality of pixel ICs 610 to 640 may not be fixed, and may be varied depending on control data received from the driver IC. For example, the first pixel IC 610 may turn on four LEDs 611-614 disposed at an upper end in a left-to-right direction, and may turn on the remaining four LEDs 615-618 disposed at a lower end in order in the direction from the left side to the right side. Accordingly, in the first pixel IC 610, the first to eighth LEDs 611-618 may be turned on in order, and the driving order of the second pixel IC 620 may be the same as that of the first pixel IC 610.

The driving order of each of the third pixel IC 630 and the fourth pixel IC 640 may be different from that of the first pixel IC 610. For example, to turn on the plurality of LEDs in the same direction as that of the first pixel IC 610, the third pixel IC 630 may turn on the fifth to eighth LEDs 635-638 in a direction from the eighth LED 638 to the fifth LED 635. Thereafter, the third pixel IC 630 may turn on the fourth LED 634 first and may turn on the first LED 631 last among the first to fourth LEDs 631-634. In other words, the third pixel IC 630 may turn on the first to eighth LEDs 631-638 in the reverse order. The driving order of the third pixel IC 630 and the fourth pixel IC 640 may be the same.

The driving order of each of the plurality of pixel ICs 610-640 may be varied depending on control data, and for example, the driving order of each of the plurality of pixel ICs 610-640 may be determined according to data indicating the driving order, included in the control data. In an example embodiment, control data received and stored by each of the plurality of pixel ICs 610 to 640 may be represented as illustrated in Table 3 below. In the example embodiment illustrated in Table 3, each of the plurality of pixel ICs 610-640 may turn on the entirety of LEDs.

TABLE 3

| Identification No. | First turn-on | Second turn-on | Third turn-on | Fourth turn-on | Fifth turn-on | Sixth turn-on | Seventh turn-on | Eighth turn-on |
|---|---|---|---|---|---|---|---|---|
| 1 | CH1 | CH2 | CH3 | CH4 | CH5 | CH6 | CH7 | CH8 |
| 2 | CH1 | CH2 | CH3 | CH4 | CH5 | CH6 | CH7 | CH8 |
| 3 | CH8 | CH7 | CH6 | CH5 | CH4 | CH3 | CH2 | CH1 |
| 4 | CH8 | CH7 | CH6 | CH5 | CH4 | CH3 | CH2 | CH1 |

Similarly to the aforementioned example embodiment with reference to FIG. 7, the plurality of pixel ICs 610-640 may not be lead pixel ICs directly connected to the driver IC or last pixel ICs receiving a data signal output by the driver IC latest, and may be intermediate pixels ICs connected therebetween. Accordingly, each of the plurality of pixel ICs 610 to 640 may be connected to a first neighboring pixel IC and a second neighboring pixel IC, may receive a data signal from the first neighboring pixel IC, and may transmit the data signal to the second neighboring pixel IC. For example, the first neighboring pixel IC for the second pixel IC 620 may be the first pixel IC 610, and the second neighboring pixel IC may be the third pixel IC 630. The first neighboring pixel IC for the third pixel IC 630 may be the second pixel IC 620, and the second neighboring pixel IC may be the fourth pixel IC 640.

At least one of the intermediate pixel ICs may be adjacent to the first neighboring pixel IC in a first direction and may be adjacent to the second neighboring pixel IC in a second direction intersecting the first direction. In the example embodiment in FIG. 8, the second pixel IC 620 may be adjacent to the first pixel IC 610 which may be a first neighboring pixel IC in a first direction (the horizontal direction), and may be adjacent to the third pixel IC 630 which may be the second neighboring pixel IC in a second direction (the vertical direction).

Also, at least one of the remaining intermediate pixels ICs may be adjacent to the first neighboring pixel IC in the second direction and may be adjacent to the second neighboring pixel IC in the first direction. Referring to FIG. 8, the third pixel IC 630 may be adjacent to the second pixel IC 620 which may be the first neighboring pixel IC in the second direction, and may be adjacent to the fourth pixel IC 620 which may be the second neighboring pixel IC in the first direction.

Figure 9:
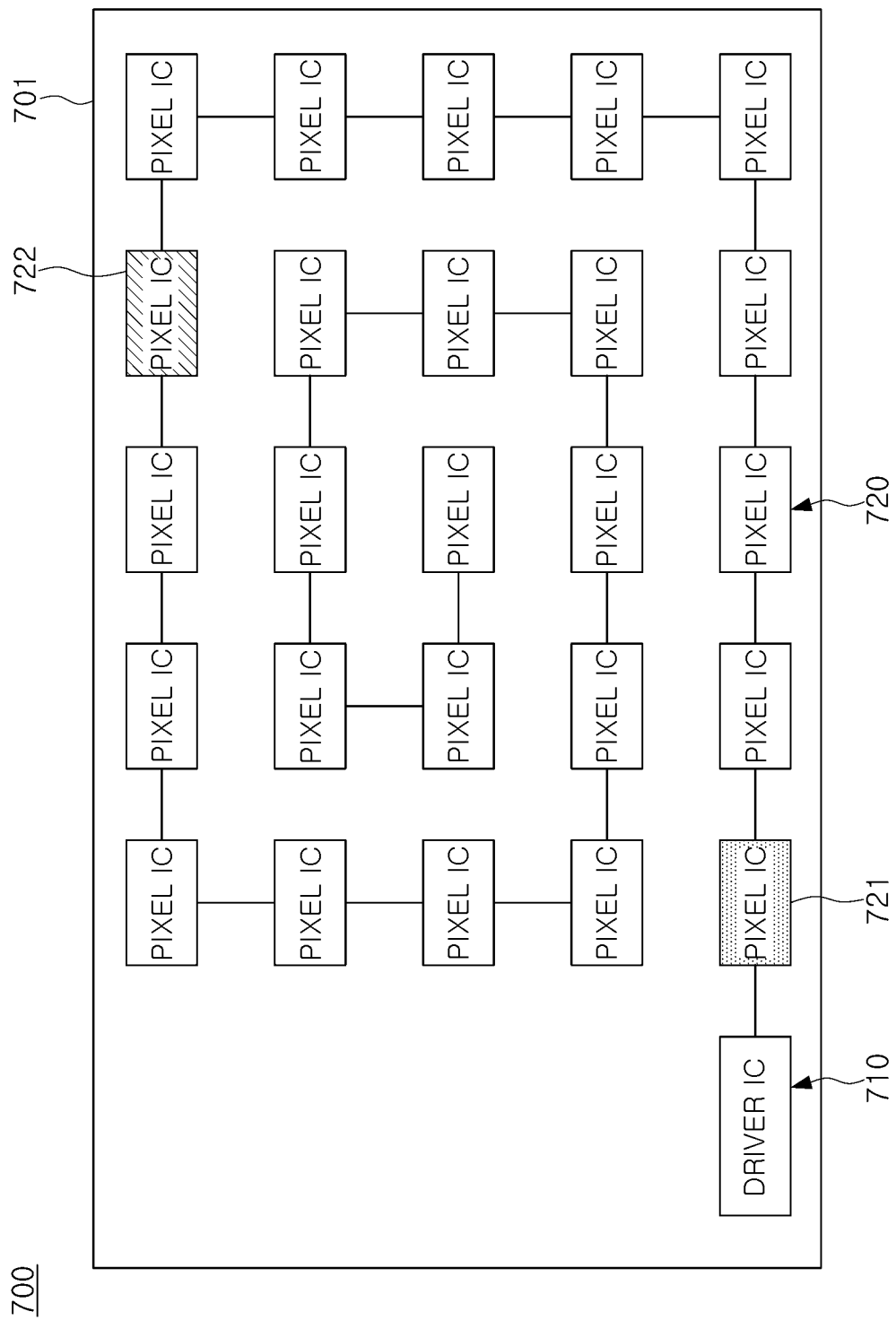
FIG. 9 illustrates a block diagram of a backlight system according to embodiments of the inventive concepts.

FIG. 9 illustrates a diagram of a backlight system according to embodiments of the inventive concepts.

Referring to FIG. 9, a backlight system 700 in an example embodiment may include a circuit board 701, a driver IC 710, and a plurality of pixel ICs 720. The driver IC 710 and the plurality of pixel ICs 720 may be mounted on the circuit board 701, and may be electrically connected to each other by wiring patterns formed on the circuit board 701. However, in example embodiments, the driver IC 710 may not be mounted together on the circuit board 701 on which the plurality of pixel ICs 720 are mounted. Each of the plurality of pixel ICs 720 may be connected to two or more LEDs and may control each of the LEDs to be turned on/off. A reflective layer may be formed in a region of the circuit board 701 other than the region in which the driver IC 710, the plurality of pixel ICs 720, and the plurality of LEDs are mounted.

The plurality of pixel ICs 720 may operate by receiving a power supply voltage and a data signal from the driver IC 710. The driver IC 710 may generate a power supply voltage necessary for operation of the plurality of pixel ICs 720 using commercial AC power. Also, the driver IC 710 may receive data for controlling each of the plurality of pixel ICs 720 from a controller of the display device on which the backlight system 700 is mounted, and may generate a data signal including control data using the data. The data signal generated by the driver IC 710 may include identification information of each of the plurality of pixel ICs 720 and control data of each of the plurality of pixel ICs 720.

The plurality of pixel ICs 720 may be connected to each other in series. Accordingly, the data signal output by the driver IC 710 may be received by the lead pixel IC directly connected to the driver IC 710. The plurality of pixel ICs 720 may receive data signals in the order in which the plurality of pixel ICs 720 are connected and may control the turning on/off and brightness of the plurality of LEDs.

In the example embodiment in FIG. 9, the plurality of pixel ICs 720 may be mounted on the circuit board 701 and may be connected to each other in a spiral form. Each of the plurality of pixel ICs 720 may drive the plurality of LEDs in the same direction while being mounted on the circuit board 701. In an example embodiment, the driving order in which each of the plurality of pixel ICs 720 turns on and/or turns off the plurality of LEDs may be determined depending on control data which each of the plurality of pixel ICs 720 receives from the driver IC 710. In other words, the driving order of each of the plurality of pixel ICs 720 may not be fixed and may change depending on control data, and accordingly, the backlight system 700 may be designed without limitations in the mounting position and the direction of each of the plurality of pixel ICs 720.

For example, the first pixel IC 721 and the second pixel IC 722 may be mounted on the circuit board 701 in different directions. The first control data received by the first pixel IC 721 may instruct a first driving order, and the second control data received by the second pixel IC 722 may indicate a second driving order. For example, the first driving order and the second driving order may be different from each other. Also for example, the order in which the LEDs connected to the first pixel IC 721 are turned on while mounted on the circuit board 701 may be the same as the order in which the LEDs connected to the second pixel IC 722 are turned on. Hereinafter, this configuration will be described in greater detail with reference to FIGS. 10 and 11.

Figure 10:
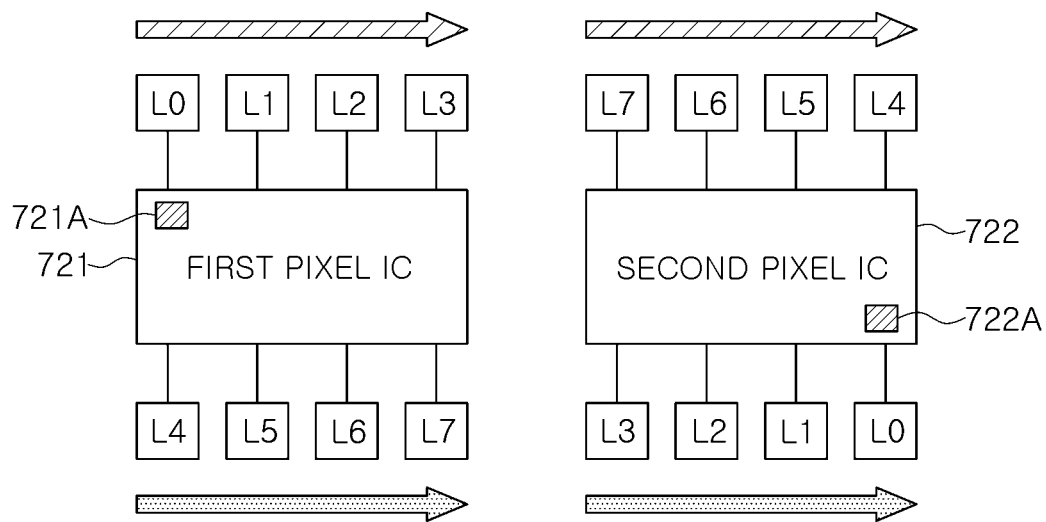
FIG. 10 illustrates a block diagram explanatory of operations of pixel ICs included in a backlight system according to embodiments of the inventive concepts.
Figure 11:
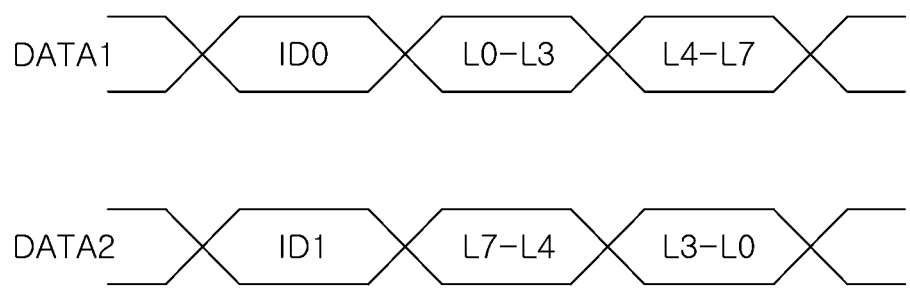
FIG. 11 illustrates first and second control data of the backlight system of FIG. 10.

FIGS. 10 and 11 illustrate diagrams explanatory of operations of pixel ICs included in a backlight system according to embodiments of the inventive concepts.

Referring to FIG. 10, as described above, the first pixel IC 721 and the second pixel IC 722 may be mounted in different directions. The first pixel IC 721 may be mounted such that an alignment key 721A may be disposed at an upper left end, whereas the second pixel IC 722 may be mounted such that the alignment key 722A may be disposed at a lower right end. In other words, the first pixel IC 721 and the second pixel IC 722 may be rotated 180 degrees with respect to each other in a state in which the first pixel IC 721 and the second pixel IC 722 are mounted on the circuit board.

However, as mounted on the circuit board, the order in which the LEDs L0-L7 connected to the first pixel IC 721 and the second pixel IC 722 are turned on may be the same. For example, among the LEDs L0-L7 connected to the first pixel IC 721, the first to fourth LEDs L0-L3 connected to an upper end of the first pixel IC 721 may be first turned on in order, and the fifth to eighth LEDs L4-L7 connected to a lower end may be turned on in order thereafter.

If the driving order of the second pixel IC 722 may not be adjusted, the order in which the LEDs L0-L7 connected to the first pixel IC 721 are turned on in a state of being mounted on the circuit board may be different from the order in which the LEDs L0-L7 connected to the second pixel IC 722 are turned on. However, in an example embodiment of the inventive concepts, since the driving order of each of the pixel ICs 721 and 722 may be varied depending on control data, the above issue may be addressed. Referring to FIG. 10, the second pixel IC 722 may turn on the fifth to eighth LEDs L4-L7 in the reverse order, and may turn on the first to fourth LEDs L0-L3 in the reverse order thereafter. Accordingly, as illustrated in FIG. 10, in a state of being mounted on the circuit board, the order in which the LEDs L0-L7 connected to the first pixel IC 721 are turned on may coincide with the order in which the LEDs L0-L7 connected to the second pixel IC 722 are turned on.

An example embodiment described with reference to FIG. 10 may be widely applied to pixel ICs connected to N LEDs through N channels. For example, the first pixel IC may turn on a portion of LEDs connected to the first group of first to Mth channels in order, and may turn on the remaining LEDs connected to the second group of M+1 to Nth channels in order thereafter. The second pixel IC may turn on a portion of LEDs connected to the M+1th to Nth channels in the reverse order, and may turn on the remaining LEDs connected to the first to Mth channels in the reverse order thereafter. M may be a natural number greater than 1 and less than N, and may be, for example, N/2.

Also, in example embodiments, the order in which each of the pixel ICs turns on the plurality of LEDs may be varied. For example, each of the pixel ICs may divide a plurality of channels into three or more groups, and at least one LED may be connected to each group. The pixel IC may determine a driving order of channels included in each of the plurality of groups based on the received control data. Assuming that a single channel is included in each of the plurality of groups and a single LED is connected to a single channel, each of the pixel ICs may freely change the driving order of the plurality of LEDs according to the driving order specified in the control data. Alternatively, a plurality of channels may be simultaneously driven without grouping depending on control data, and in this case, a plurality of LEDs connected to a single pixel IC may be simultaneously turned on.

FIG. 11 illustrates first control data DATA1 and second control data DATA2 respectively received by the first pixel IC 721 and the second pixel IC 722. The first pixel IC 721 may be connected between the driver IC and the second pixel IC 722, and may thus receive a data signal including both the first control data DATA1 and the second control data DATA2. The first pixel IC 721 may select and store the first control data DATA1, and may output the second control data DATA2 to the second pixel IC 722.

Referring to FIG. 11, in each of the first control data DATA1 and the second control data DATA2, pieces of individual control data for the LEDs L0-L7, respectively, may be aligned in different order according to the driving orders of the first pixel IC 721 and the second pixel IC 722. As described in the aforementioned example embodiment with reference to FIG. 10, the first pixel IC 721 may drive the first to eighth LEDs L0-L7 in order. Accordingly, the first control data DATA1 may include pieces of individual control data aligned to turn on the first to fourth LEDs L0-L3 in order and to turn on the fifth to eighth LEDs L4-L7 in order thereafter.

The second pixel IC 722 may drive the fifth to eighth LEDs L4-L7 in the reverse order, and may drive the first to fourth LEDs L0-L3 in the reverse order thereafter. In other words, the second pixel IC 722 may operate with a driving order of [eighth LED (L7)→seventh LED (L6)→sixth LED (L5)→fifth LED (L4)→fourth LED (L3)→third LED (L2)→second LED (L1)→first LED (L0)]. Accordingly, the second control data DATA2 generated by the driver IC and transmitted to the second pixel IC 722 may include pieces of individual control data aligned according to the driving order as illustrated in FIG. 11.

Referring to FIG. 11, the first control data DATA1 includes first identification information ID0 that matches the identification information of the first pixel IC 721 and that is included in the data signal, and the second control data DATA2 includes second identification information ID1 that matches the identification information of the second pixel IC 722 and that is included in the data signal. Accordingly, the first pixel IC 721 may select and store the first control data DATA1 matching the first identification information ID0, and the second pixel IC 722 may select and store the second control data DATA2 matching the second identification information ID1.

However, as described above, the data signal may not include the identification information ID0 and ID1. In this case, each of the first pixel IC 721 and the second pixel IC 722 may select control data corresponding thereto from the data signal according to the order of the control data in the received data signal.

Figure 12:
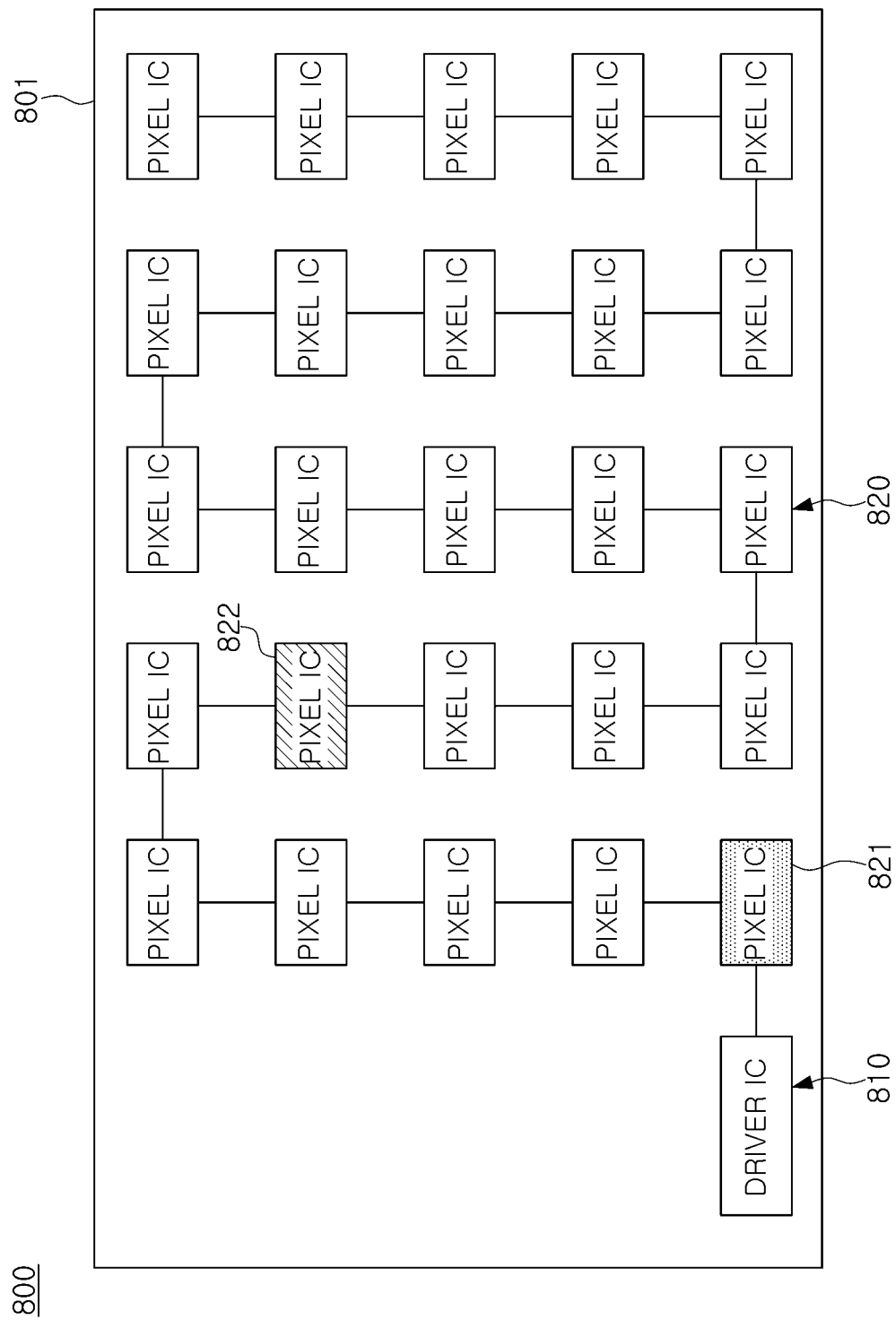
FIG. 12 illustrates a block diagram of a backlight system according to embodiments of the inventive concepts.

FIG. 12 illustrates a diagram of a backlight system according to embodiments of the inventive concepts.

Referring to FIG. 12, the backlight system 800 in an example embodiment may include a circuit board 801, a driver IC 810, and a plurality of pixel ICs 820. The configurations of the driver IC 810, the plurality of pixel ICs 820, and the circuit board 801 may be similar to the aforementioned example embodiment described with reference to FIG. 9. However, in the example embodiment illustrated in FIG. 12, the plurality of pixel ICs 820 may be disposed in a meandering form, differently from the example embodiment illustrated in FIG. 9.

The plurality of pixel ICs 820 may operate by receiving a power supply voltage and a data signal from the driver IC 810. The data signal output by the driver IC 810 may be received by a lead pixel IC directly connected to the driver IC 810, and may be transmitted between the plurality of pixel ICs 820 in order. The last pixel IC disposed farthest from the driver IC 810 may not output a data signal to another pixel IC.

In the example embodiment in FIG. 12, the first pixel IC 821 and the second pixel IC 822 may turn on the LEDs in different driving orders. Hereinafter, this configuration will be described in greater detail with reference to FIGS. 13 and 14.

Figure 13:
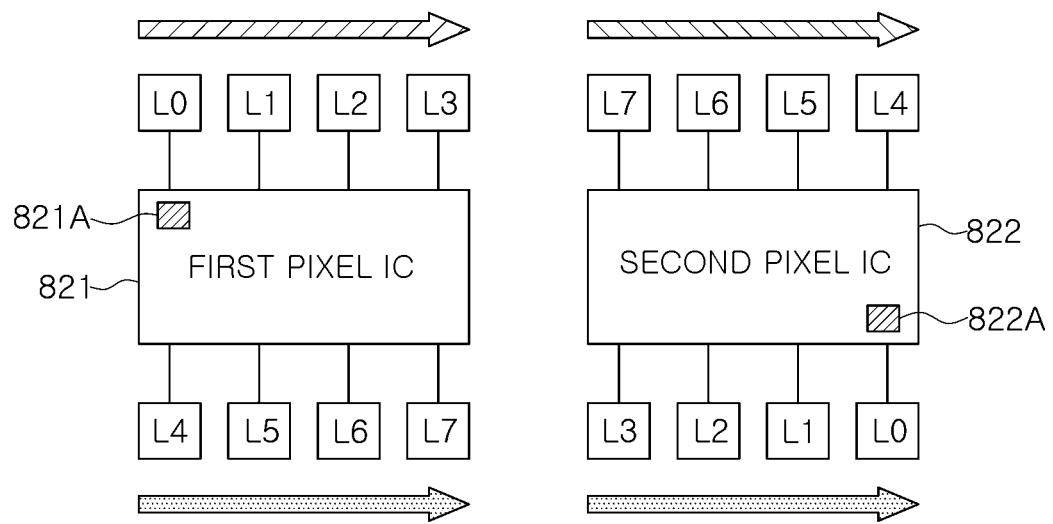
FIG. 13 illustrates a block diagram explanatory of operations of pixel ICs included in a backlight system according to embodiments of the inventive concepts.
Figure 14:
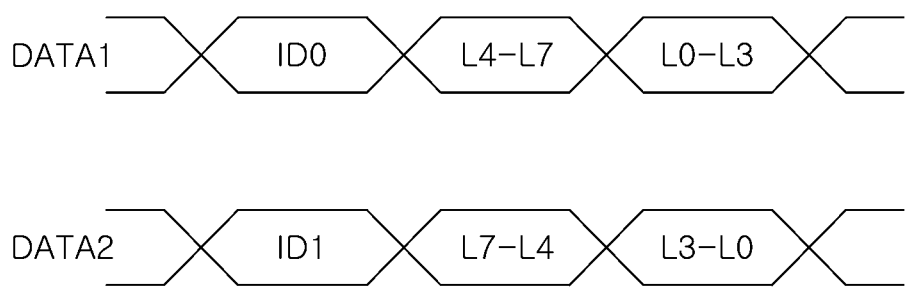
FIG. 14 illustrates first and second control data of the backlight system of FIG. 13.

FIGS. 13 and 14 illustrate diagrams explanatory of operation of pixel ICs included in a backlight system according to embodiments of the inventive concepts.

Referring to FIG. 13, the first pixel IC 821 and the second pixel IC 822 may be mounted in different directions. The first pixel IC 821 may be mounted such that the alignment key 821A may be disposed at an upper left end, whereas the second pixel IC 822 may be mounted such that the alignment key 822A is disposed at a lower right end. The first pixel IC 821 and the second pixel IC 822 may be mounted on a circuit board rotated by 180 degrees with respect to each other.

An order in which each of the LEDs L0-L7 connected to the first pixel IC 821 and the second pixel IC 822 is turned on may be determined by control data in a state in which each of the LEDs L0-L7 is mounted on the circuit board. For example, the first pixel IC 821 may first turn on the fifth to eighth LEDs L4-L7 in order, and may then turn on the first to fourth LEDs L0-L3 in order. The second pixel IC 822 may turn on the LEDs L0-L7 in an order different from that of the first pixel IC 821. Referring to FIG. 13, the second pixel IC 822 may first turn on the fifth to eighth LEDs L4-L7 in the reverse order, and may turn on the first to fourth LEDs L0-L3 in the reverse order thereafter.

Accordingly, in the example embodiment illustrated in FIG. 13, the first pixel IC 821 and the second pixel IC 822 may turn on the LEDs L0-L7 in the left-right symmetrical order as mounted on the circuit board. In this case, in the example embodiment illustrated in FIG. 12, the LEDs L0-L7 may be controlled to be turned on according to the direction in which the plurality of pixel ICs 820 are connected.

An example embodiment described with reference to FIG. 13 may be widely applied to pixel ICs connected to N number of LEDs through N number of channels. For example, a first pixel IC may turn on a portion of LEDs connected to the first to Mth channels, and may turn on the remaining LEDs connected to the M+1th to Nth channels in order thereafter. A second pixel IC may turn on a portion of LEDs connected to the M+1th to Nth channels in the reverse order, and may turn on the remaining LEDs connected to the first to Mth channels in the reverse order thereafter. M may be a natural number greater than 1 and less than N, and may be, for example, N/2.

Accordingly, the driving orders of the LEDs L0-L7 may be defined differently in the first control data DATA1 received by the first pixel IC 821 and the second control data DATA2 received by the second pixel IC 822. Referring to FIG. 14, in each of the first control data DATA1 and the second control data DATA2, individual control data for each of the LEDs L0-L7 may be aligned in different orders according to the driving order of the first pixel IC 821 and the second pixel IC 822.

As described above, the first pixel IC 821 may drive the first to eighth LEDs L0-L7 in order. Accordingly, the first control data DATA1 may include pieces of individual control data aligned to turn on the fifth to eighth LEDs L4-L7 in order and to turn on the first to fourth LEDs L0-L3 in order thereafter.

The second pixel IC 822 may drive the LEDs L0-L7 in different order. The second pixel IC 822 may turn on the LEDs L0-L7 in a driving order of [eighth LED (L7)→seventh LED (L6)→sixth LED (L5)→fifth LED (L4)→fourth LED (L3)→third LED (L2)→second LED (L1)→first LED (L0)]. Accordingly, the second control data DATA2 generated by the driver IC and transmitted to the second pixel IC 822 may include pieces of individual control data arranged according to the driving order as illustrated in FIG. 14.

Referring to FIG. 14, the first control data DATA1 includes the first identification information ID0 that matches the identification information of the first pixel IC 821 and that is included in the data signal, and the second control data DATA2 includes the second identification information ID1 that matches the identification information of the second pixel IC 822 and that is included in the data signal. The first pixel IC 821 may select and store the first control data DATA1 matching the first identification information ID0, and the second pixel IC 822 may select and store the second control data DATA2 matching the second identification information ID1. However, as described above, the data signal may not include the identification information ID0 and ID1.

Figure 15:
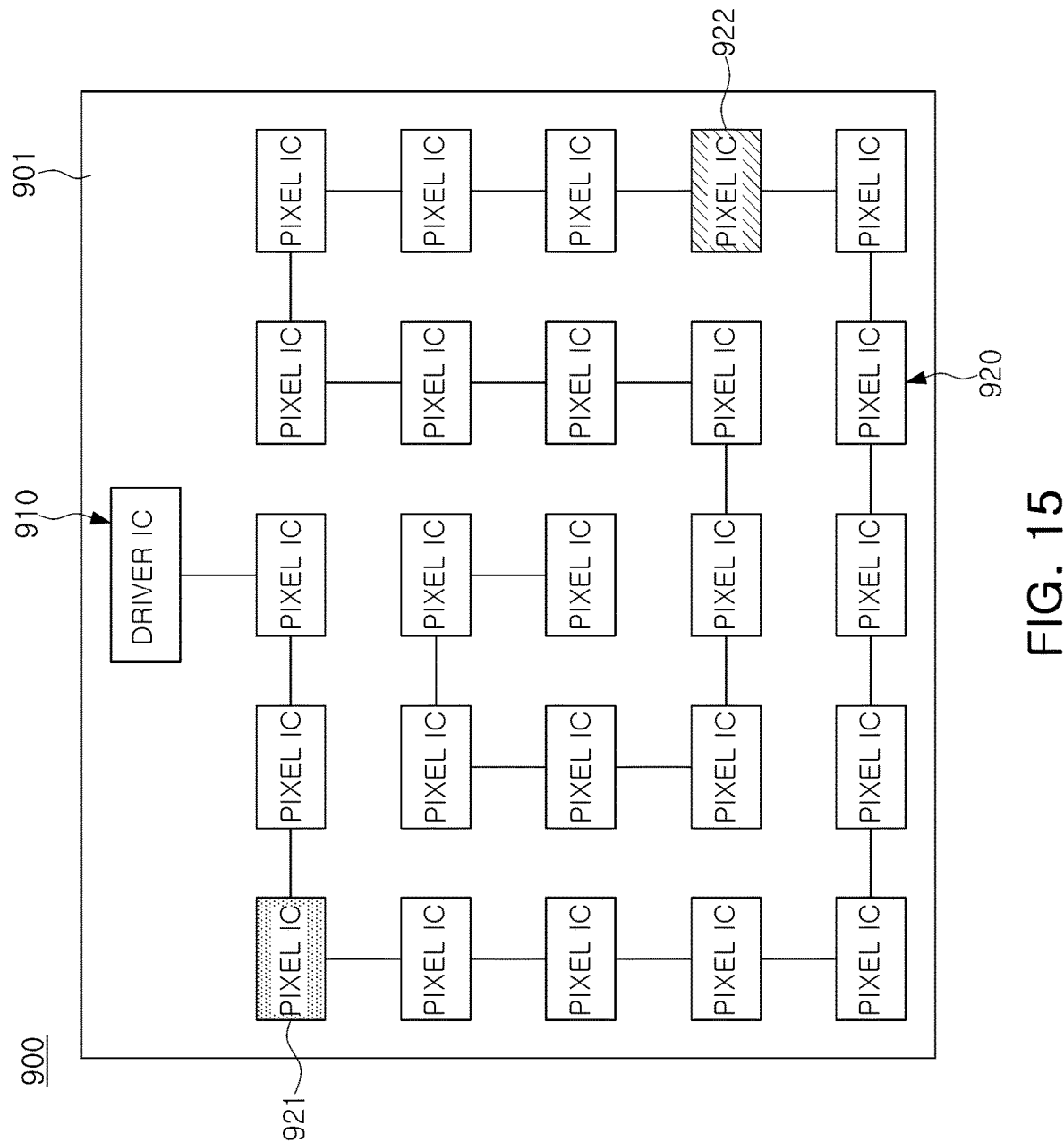
FIG. 15 illustrates a block diagram of a backlight system according to embodiments of the inventive concepts.

FIG. 15 illustrates a diagram of a backlight system according to embodiments of the inventive concepts.

Referring to FIG. 15, a backlight system 900 in an example embodiment may include a circuit board 901, a driver IC 910, and a plurality of pixel ICs 920. The configurations of the driver IC 910, the plurality of pixel ICs 920, and the circuit board 901 may be similar to the examples described in the aforementioned example embodiment with reference to FIG. 9. In the example embodiment illustrated in FIG. 15, the plurality of pixel ICs 920 may be arranged in a spiral shape similar to the example embodiment illustrated in FIG. 9. However, the driver IC 910 may be disposed on the plurality of pixel ICs 920.

The plurality of pixel ICs 920 may operate by receiving a power supply voltage and a data signal from the driver IC 910. The data signal output by the driver IC 910 may be received by a lead pixel IC directly connected to the driver IC 910, and may be sequentially transmitted between the plurality of pixel ICs 920.

In the example embodiment in FIG. 15, the first pixel IC 921 and the second pixel IC 922 may turn on the LEDs according to different driving orders. Hereinafter, this configuration will be described in greater detail with reference to FIGS. 16 and 17.

Figure 16:
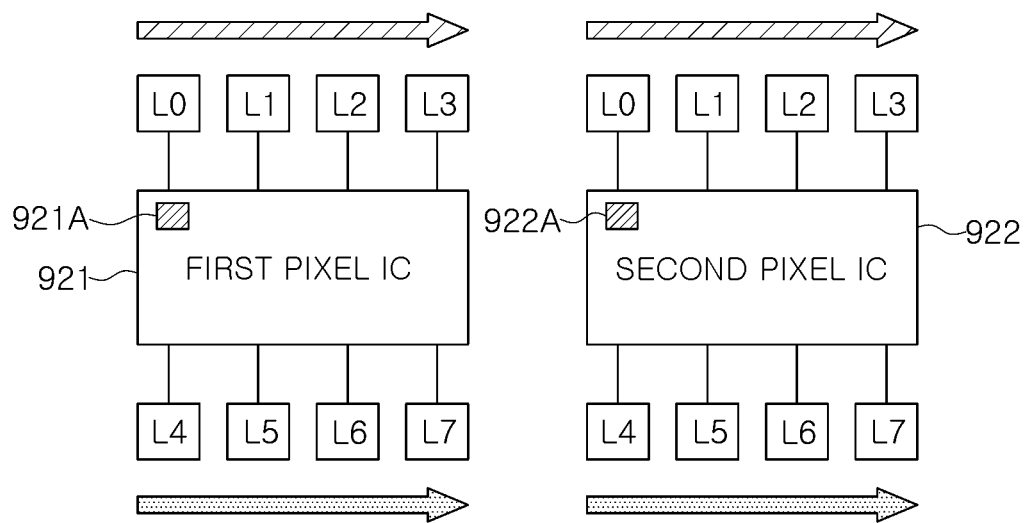
FIG. 16 illustrates a block diagram explanatory of operations of pixel ICs included in a backlight system according to embodiments of the inventive concepts.
Figure 17:
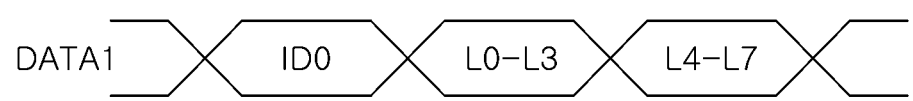
FIG. 17 illustrates first and second control data of the backlight system of FIG. 16.
Figure 17:
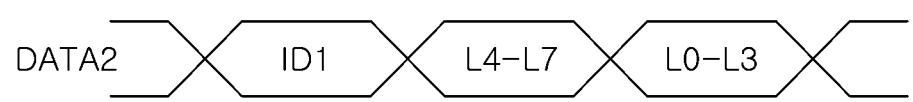

FIGS. 16 and 17 illustrate diagrams explanatory of operations of pixel ICs included in a backlight system according to an example embodiment.

Referring to FIG. 16, the first pixel IC 921 and the second pixel IC 922 may be mounted in the same direction. The first pixel IC 921 may be mounted such that the alignment key 921A may be disposed at an upper left end, and the second pixel IC 922 may also be mounted such that the alignment key 922A may be disposed at an upper left end.

However, while being mounted on the circuit board, the orders in which the LEDs L0-L7 connected to the first pixel IC 921 and the second pixel IC 922 is turned on may be different. For example, assuming that the first pixel IC 921 turns on the first to eighth LEDs L0-L7 in order, the second pixel IC 922 may turn on the fifth to eighth LEDs L4-L7 in order, and may turn on the first to fourth LEDs L0-L3 in order thereafter.

An example embodiment described with reference to FIG. 16 may be widely applied to pixel ICs connected to N LEDs through N channels. For example, the first pixel IC may turn on a portion of LEDs connected to the first to Mth channels in order, and may turn on the remaining LEDs connected to the M+1th to Nth channels in order thereafter. The second pixel IC may turn on a portion of LEDs connected to the M+1th to Nth channels, and may turn on the remaining LEDs connected to the first to Mth channels in order thereafter. M may be a natural number greater than 1 and less than N, and may be, for example, N/2.

The control data DATA1 and DATA2 received by each of the first pixel IC 921 and the second pixel IC 922 mounted on the circuit board in the same direction may instruct different driving orders. Referring to FIG. 17, in each of the first control data DATA1 and the second control data DATA2, individual control data for turning on each of the LEDs L0-L7 may be arranged in a different order.

As described above, the first pixel IC 921 may drive the first to eighth LEDs L0-L7. Accordingly, the first control data DATA1 may include pieces of individual control data aligned to turn on the first to fourth LEDs L0-L3 in order and to turn on the fifth to eighth LEDs L4-L7 in order thereafter.

The second pixel IC 922 may drive the fifth to eighth LEDs L4-L7 in order and may drive the first to fourth LEDs L0-L3 in order thereafter. In other words, the second pixel IC 922 may turn on the LEDs L0-L7 in the driving order of [fifth LED (L4)→sixth LED (L5)→seventh LED (L6)→eighth LED (L7)→first LED (L0)→second LED (L1)→third LED (L2)→fourth LED (L3)]. Accordingly, the second control data DATA2 generated by the driver IC and transmitted to the second pixel IC 922 may include pieces of individual control data arranged according to the driving order as illustrated in FIG. 17. As described above, the first pixel IC 921 and the second pixel IC 922 may select and store the first control data DATA1 and the second control data DATA2 with reference to the identification information ID0 and ID1, respectively. Alternatively, when the data signal does not include the identification information ID0 and ID1, the first pixel IC 921 and the second pixel IC 922 may select the first control data DATA1 and the second control data DATA2, respectively, in the order in which the data signals are received.

In the aforementioned example embodiments, the control data corresponding to a single pixel IC may include individual control data for a plurality of LEDs, and each of the individual control data may be data of 2 bits or more. Controllers of the pixel ICs may adjust brightness of the plurality of LEDs with reference to a plurality of pieces of individual control data included in the control data, respectively. However, in an example embodiment, the number of bits of each of pieces of individual control data may be varied.

For example, as described in the aforementioned example embodiment with reference to FIGS. 4 and 5, the pixel IC may include a plurality of switch elements connected to a plurality of channels, and a control signal output by the controller to each of the plurality of switch elements may be provided. The controller may control the plurality of LEDs individually by referring to each of the individual control data included in the control data received through the data signal input terminal and may determine a frequency, a duty ratio, and the like, of the control signal output to each of the plurality of switch elements. Accordingly, since the color and brightness of light implemented in each of the plurality of pixel ICs may be determined depending on control data received by each of the plurality of pixel ICs, a local dimming function using each of the plurality of pixel ICs as a unit may be implemented in the backlight system.

FIGS. 18 to 22 illustrate diagrams of backlight systems according to respective embodiments of the inventive concepts.

Figure 18:
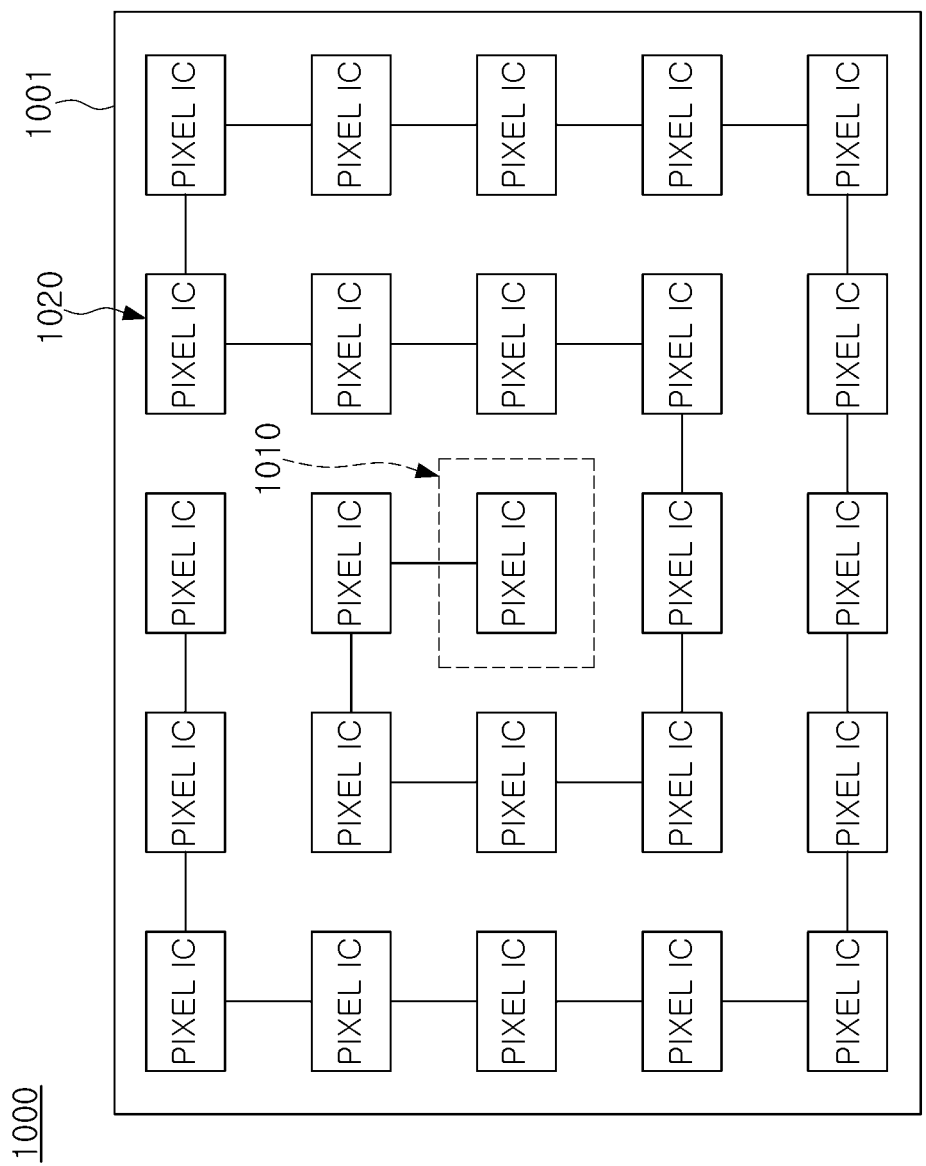
FIGS. 18, 19, 20, 21 and 22 illustrate block diagrams of respective backlight system according to embodiments of the inventive concepts.

Referring to FIG. 18, a backlight system 1000 in an example embodiment may include a circuit board 1001, a driver IC 1010, and a plurality of pixel ICs 1020. In the example embodiment in FIG. 18, a plurality of pixel ICs 1020 and the driver IC 1010 may be mounted on different surfaces of the circuit board 1001.

Referring to FIG. 18, a plurality of pixel ICs 1020 may be mounted on a front surface of the circuit board 1001 and may output light to the display panel (see FIGS. 1A and 1B), and the driver IC 1010 may be disposed on a rear surface of the circuit board 1001. The driver IC 1010 may be connected to the lead pixel IC through a wiring passing through the circuit board 1001 or bypassing the circuit board 1001.

Operation of the backlight system 1000 may be similar to the aforementioned example embodiments. The plurality of pixel ICs 1020 may operate by receiving a power supply voltage and a data signal from the driver IC 1010. The driver IC 1010 may generate a power voltage required for operation of the plurality of pixel ICs 1020 using commercial AC power. Also, the driver IC 1010 may receive data for controlling each of the plurality of pixel ICs 1020 from a controller of the display device in which the backlight system 1000 is mounted, and may generate a data signal including control data using the data.

At least a portion of the plurality of pixel ICs 1020 may be mounted on the circuit board 1001 in different directions. For example, a portion of the plurality of pixel ICs 1020 may be rotated by 180 degrees. As described above, the backlight system 1000 may be easily manufactured by freely determining a mounting direction of the plurality of pixel ICs 1020 during designing if desired.

In an example embodiment, each of the plurality of pixel ICs 1020 may be connected to a plurality of LEDs, and the driving orders for turning on and/or turning off the plurality of LEDs may be varied depending on the control data received from the driver IC 1010. Accordingly, the plurality of pixel ICs 1020 may turn on the plurality of LEDs in the same direction regardless of the mounting direction of each of the plurality of pixel ICs 1020.

Figure 19:
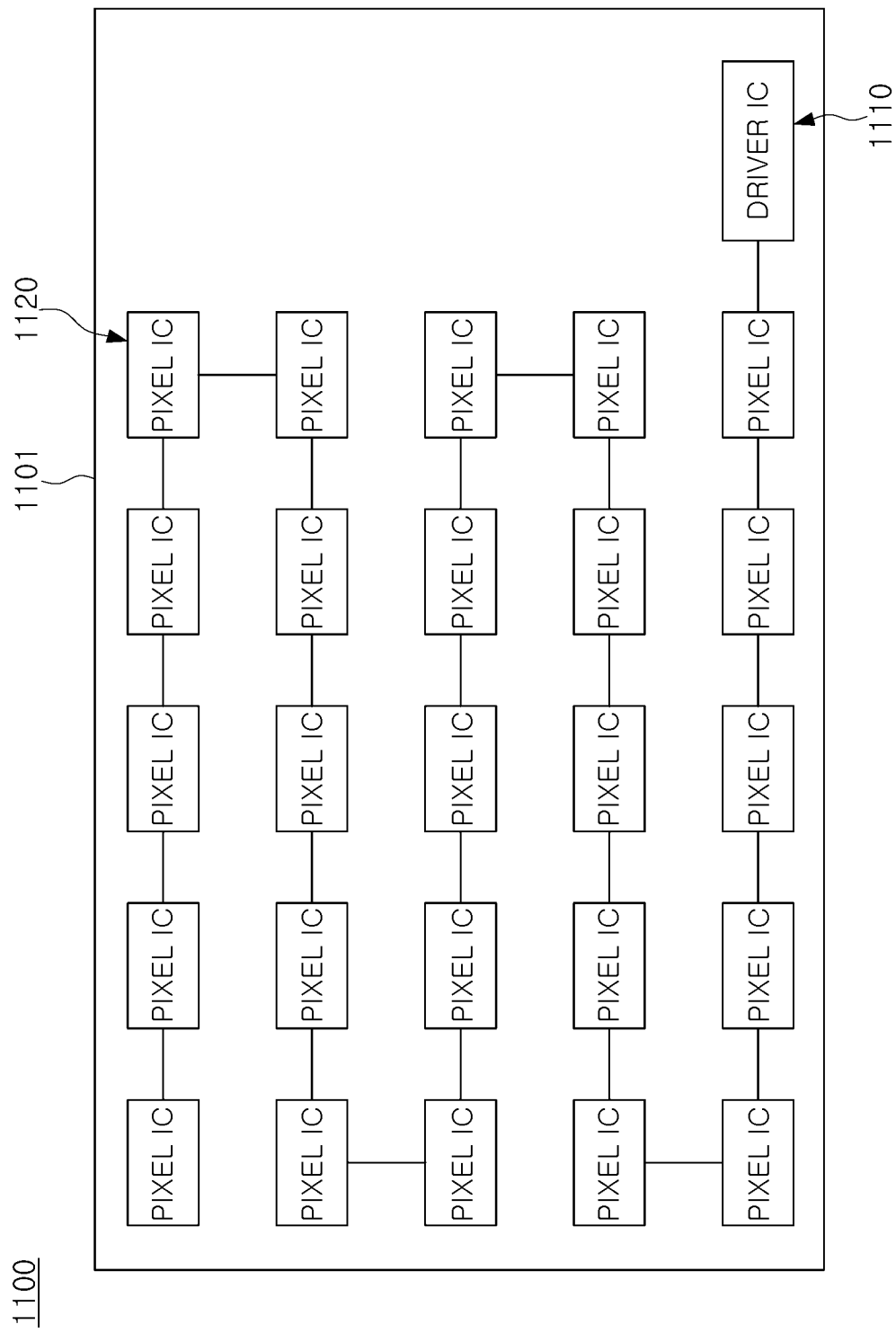

Referring to FIG. 19, the backlight system 1100 in an example embodiment may include a circuit board 1101, a driver IC 1110, and a plurality of pixel ICs 1120. In the example embodiment in FIG. 19, a plurality of pixel ICs 1120 and a driver IC 1110 may be mounted together on one surface of the circuit board 1101.

The backlight system 1100 illustrated in FIG. 19 may have a symmetric structure with the backlight system 800 described in the aforementioned example embodiment with reference to FIG. 12. Since the order of driving the plurality of LEDs in each of the plurality of pixel ICs 1120 may be freely changed according to the control data received from the driver IC 1110, both the backlight system 800 in the example embodiment in FIG. 12 and the backlight system 1100 in the example embodiment in FIG. 19 may be implemented using a single type of pixel ICs having the same structure.

In an example embodiment, by allowing the LED driving order of each of the plurality of pixel ICs 1120 to be varied, the positions of the plurality of pixel ICs 1120 and also the driver IC 1110 may be freely determined. Accordingly, even when implementing a backlight system including a plurality of driver ICs 1110, a degree of freedom in design may be increased and ease in manufacturing may be secured. Hereinafter, the relevant example embodiment will be described with reference to FIGS. 20 and 21.

Figure 20:
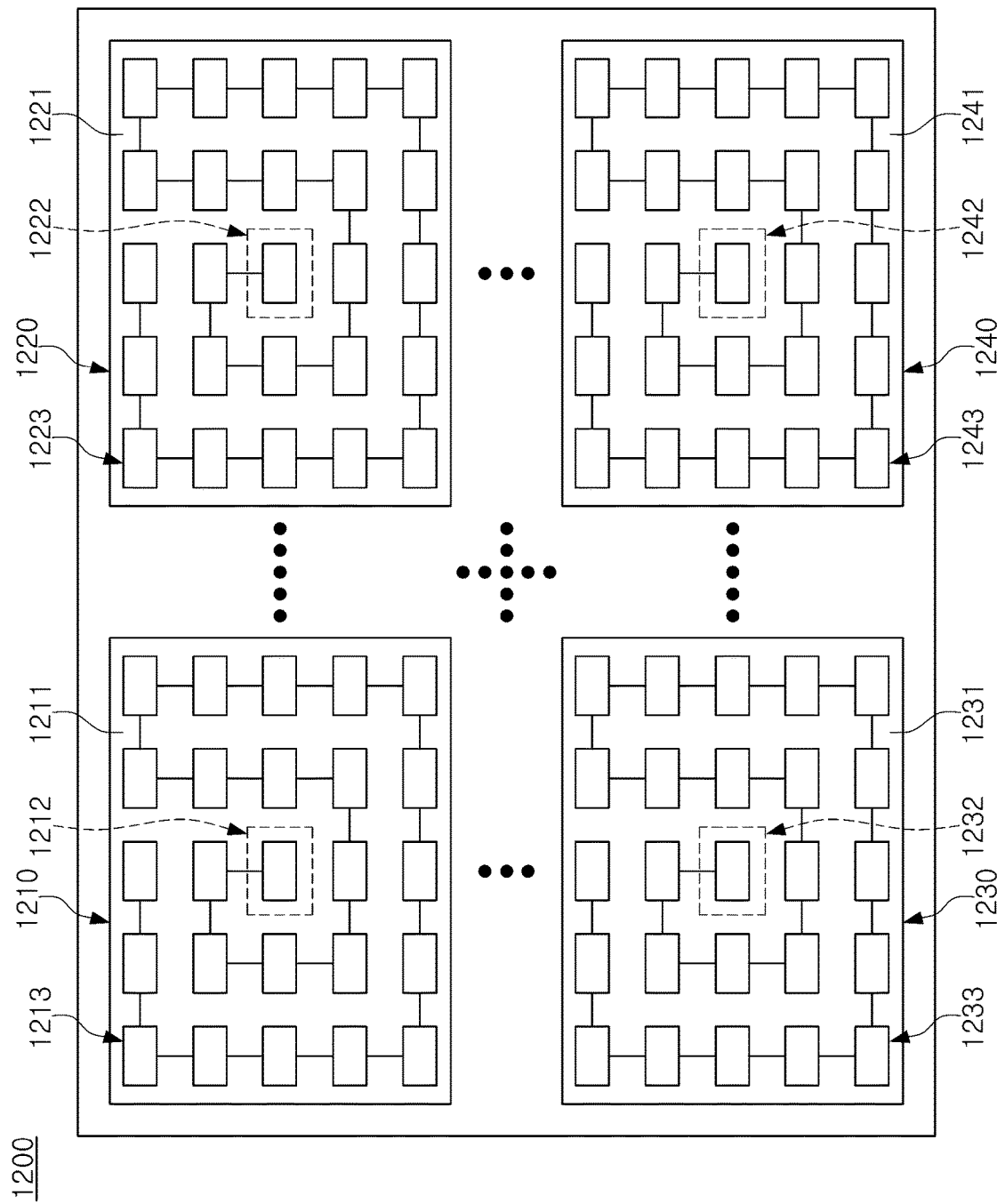

Referring to FIG. 20, the backlight system 1200 may include a plurality of LED plates 1210-1240, and each of the plurality of LED plates 1210-1240 may operate individually. For example, referring to the first LED plate 1210, the first LED plate 1210 may include a first circuit board 1211, a first driver IC 1212, and a plurality of pixel ICs 1213.

As illustrated in FIG. 20, each of the plurality of LED plates 1210-1240 may include one of driver ICs 1212, 1222, 1232, and 1242 which respectively control pixel ICs 1213, 1223, 1233 and 1243. Each of the driver ICs 1212, 1222, 1232, and 1242 may control the plurality of LED plates 1210-1240 based on data received from the controller of the display device and the driver ICs 1212, 1222, 1232, and 1242 may be disposed on a rear surface of the corresponding circuit boards 1211, 1221, 1231 and 1241. In the example embodiment illustrated in FIG. 20, the plurality of LED plates 1210-1240 may have the same structure.

Figure 21:
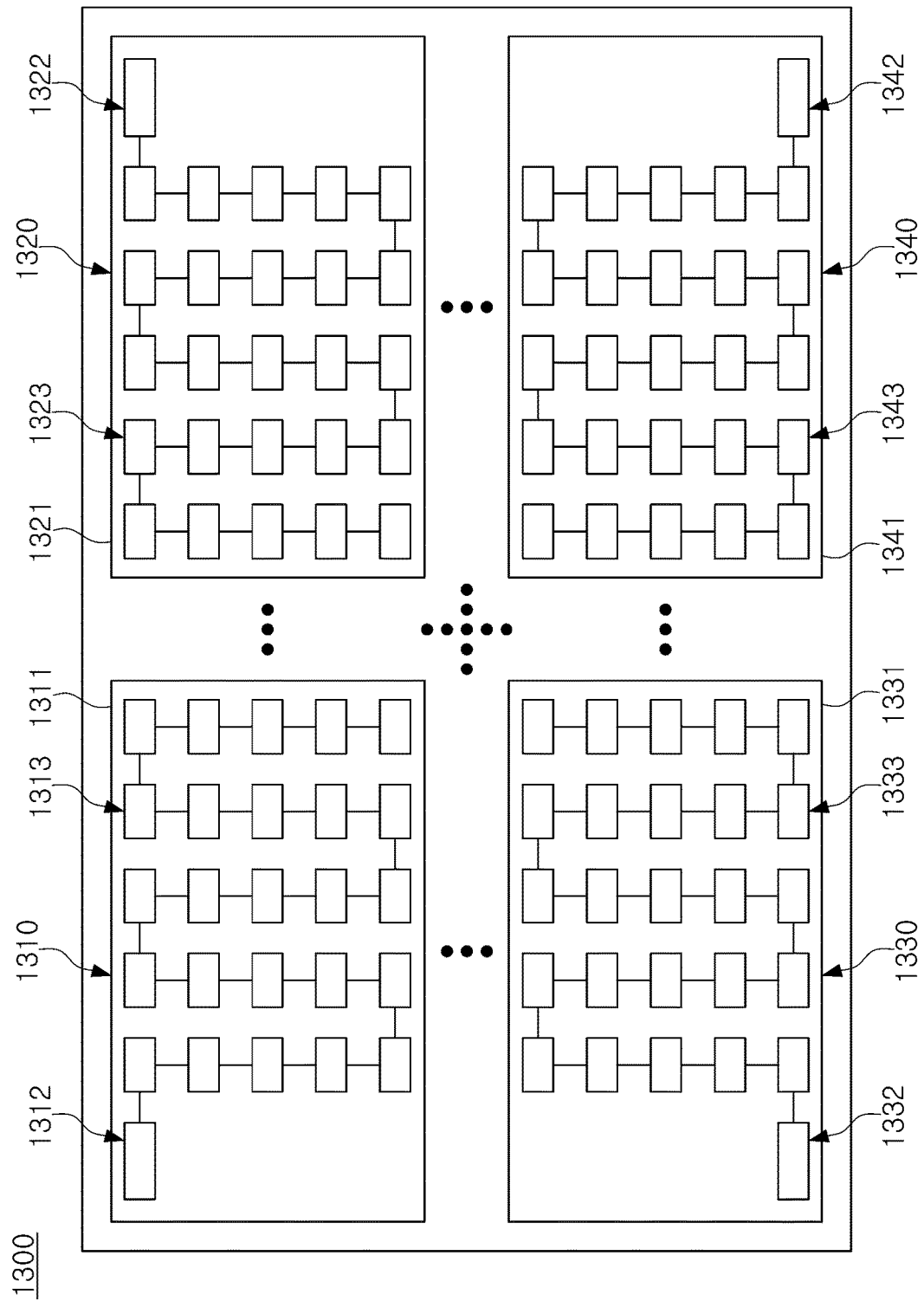

In the backlight system 1300 in an example embodiment illustrated in FIG. 21, the plurality of LED plates 1310-1340 may have different structures. Referring to FIG. 21, the first driver IC 1312 of the first LED plate 1310 may be disposed on an upper left side of the first circuit board 1311, and the second driver IC 1322 of the second LED plate 1320 may be disposed on an upper right side of the second circuit board 1321. The third driver IC 1332 of the third LED plate 1330 may be disposed on a lower left side of the third circuit board 1331, and the fourth driver IC 1342 of the fourth LED plate 1340 may be disposed on a lower right end of the fourth circuit board 1341.

In an example embodiment, the order in which each of the plurality of pixel ICs 1313, 1323, 1333, and 1343 drives the plurality of LEDs may be freely changed depending on control data. Accordingly, the limitation of wiring design connecting the driver ICs 1312, 1322, 1332, and 1342 to the plurality of pixel ICs 1313, 1323, 1333, 1343 may be reduced, and as illustrated in FIG. 21, the backlight system 1300 may be implemented using the LED plates 1310-1340 of which wirings are disposed in different directions as illustrated in FIG. 21.

Figure 22:
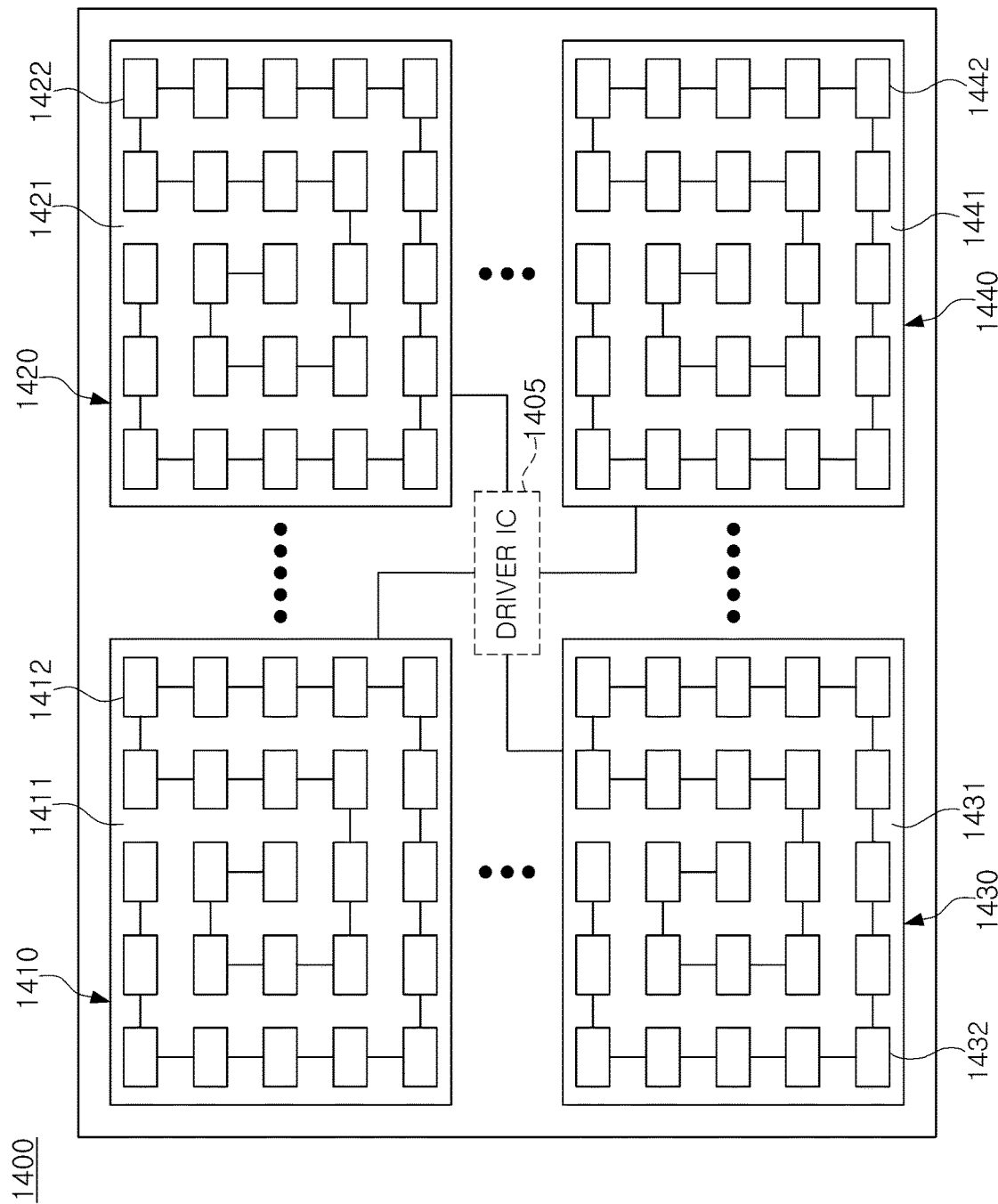

Referring to FIG. 22, the backlight system 1400 may include a plurality of LED plates 1410 to 1440, and each of the plurality of LED plates 1410 to 1440 may operate individually. For example, referring to the first LED plate 1410, the first LED plate 1410 may include a first circuit board 1411 and a plurality of pixel ICs 1412.

Referring to FIG. 22, the plurality of LED plates 1410 to 1440 may operate in response to a data signal output by one driver IC 1405. For example, the driver IC 1405 may output a plurality of data signals corresponding to the plurality of LED plates 1410 to 1440. The driver IC 1405 may be disposed on the same surface as the plurality of LED plates 1410 to 1440, or may be disposed on a surface opposite to the surface on which the plurality of LED plates 1410 to 1440 are disposed.

Each of the data signals output by the driver IC 1405 may include control data determining the order in which each of the plurality of pixel ICs 1412, 1422, 1432 and 1442 included in the corresponding LED plate among the plurality of LED plates 1410 to 1440 drives the LEDs. The LED plates 1420, 1430 and 1440 respectively include circuit boards 1421, 1431 and 1441. As described above, the order in which the LEDs connected to the plurality of pixel ICs, respectively, are turned on may be determined differently.

Figure 23:
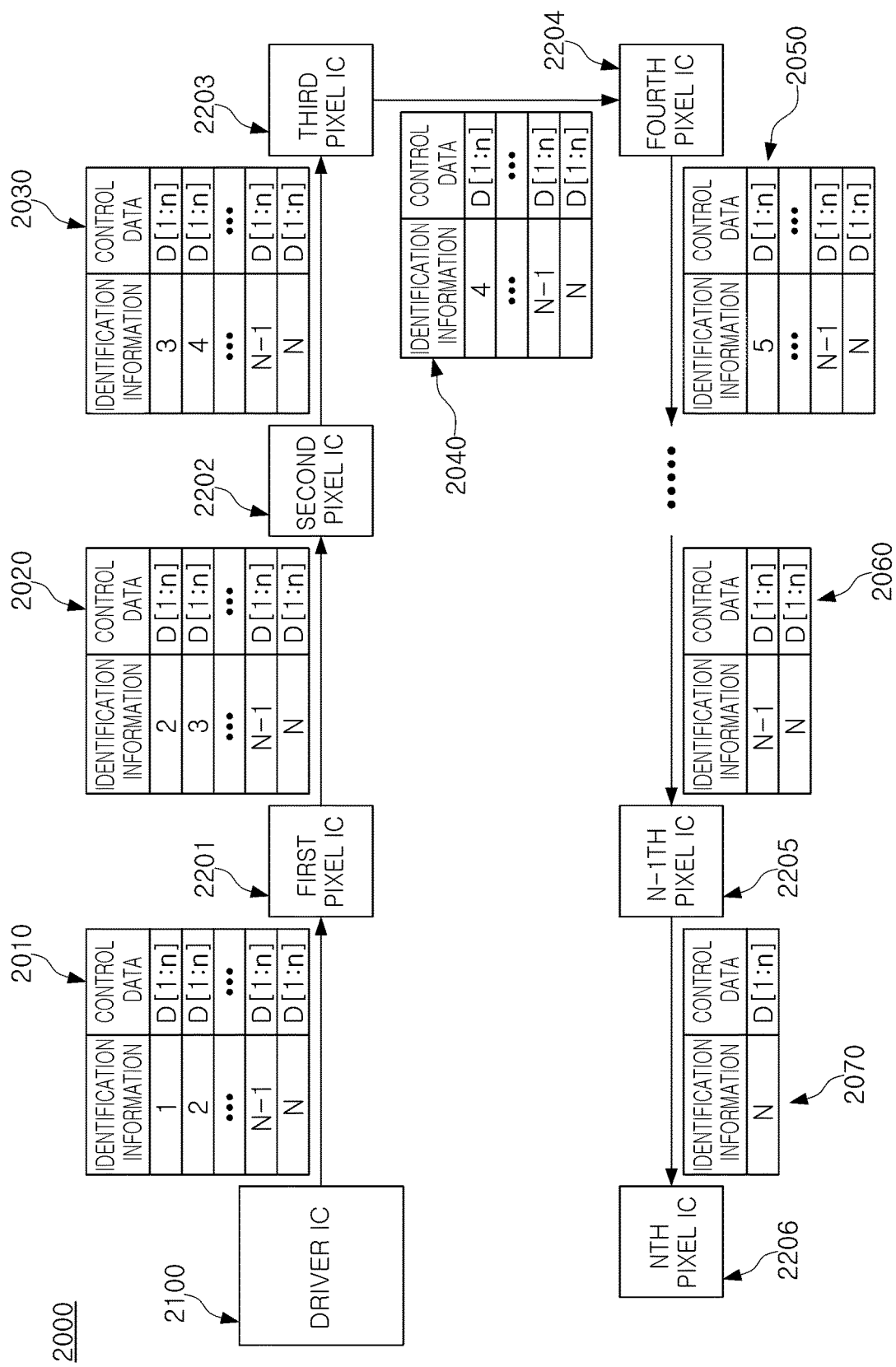
FIG. 23 illustrates a block diagram explanatory of operations of a backlight system according to embodiments of the inventive concepts.

FIG. 23 illustrates a diagram explanatory of operations of a backlight system according to embodiments of the inventive concepts.

Referring to FIG. 23, a backlight system 2000 may include a driver IC 2100 and first to Nth pixel ICs 2201-2206. The first data signal 2010 output by the driver IC 2100 to the first pixel IC 2201 which may be the lead pixel IC may include both identification information 1 to N and control data D[1:n] for the entirety of the first to Nth pixel ICs 2201-2206. The first pixel IC 2201 may select and store control data D[1:n] corresponding to identification information thereof (i.e., identification information 1) from the first data signal 2010. The first pixel IC 2201 may process the remaining control data other than the identification information thereof and the corresponding control data D[1:n] into a second data signal 2020 and may output the signal to the second pixel IC 2202.

Similarly to the first pixel IC 2201, the second pixel IC 2202 may select and store control data D[1:n] corresponding to identification information thereof (i.e., identification information 2) from the second data signal 2020, and may output the third data signal 2030 to the third pixel IC 2203. Accordingly, by passing through the pixel ICs 2201-2206, the magnitude (e.g., the size) of each of the data signals 2010-2070 may gradually decrease.

Referring to FIG. 23, the Nth pixel IC 2206 which may be the last pixel IC may receive a Nth data signal 2070 including only control data D[1:n] thereof. The Nth data signal 2070 received by the Nth pixel IC 2206 may be a signal having the smallest magnitude among the data signals 2010-2070 transmitted between the pixel ICs 2201-2206. The Nth pixel IC 2206 may not need to output a data signal to another pixel IC, and accordingly, a data signal output terminal of the Nth pixel IC 2206 may be terminated.

According to the aforementioned example embodiments, each of the plurality of pixel ICs may change the order of turning on or off the plurality of LEDs by referring to control data included in a data signal received from the driver IC. Accordingly, the arrangement and connection structure of the plurality of pixel ICs connected from the driver IC in order may be freely selected, complexity in designing the backlight system may be reduced, and the backlight system may be easily manufactured.

While example embodiments have been illustrated and described above, it should be apparent to those skilled in the art that modifications and variations may be made without departing from the spirit and scope of the inventive concepts as defined by the appended claims.

What is claimed is:

1. A backlight system, comprising:
a plurality of pixel ICs including a plurality of channels, wherein the plurality of channels are connected to a plurality of LEDs, and wherein the plurality of pixel ICs are configured to control the plurality of LEDs to be turned on and off through the plurality of channels; and
a driver IC connected to the plurality of pixel ICs and configured to supply a data signal to each of the plurality of pixel ICs,
wherein the data signal comprises first control data that specifies a first order of turning on or off a plurality of first LEDs from among the plurality of LEDs and second control data that specifies a second order of turning on or off a plurality of second LEDs from among the plurality of LEDs, the first order being different from the second order,
wherein the plurality of pixel ICs include a first pixel IC connected to the plurality of first LEDs and a second pixel IC connected to the plurality of second LEDs,
wherein the first pixel IC is configured to turn the plurality of first LEDs on or off according to the first order, and the second pixel IC is configured to turn the plurality of second LEDs on or off according to the second order, and
wherein an amount of control data in the data signals received by the plurality of pixel ICs is different from each other.

2. The backlight system of claim 1,
wherein each of the first pixel IC and the second pixel IC includes first to Nth channels from among the plurality of channels, where N is a natural number equal to or greater than 2, and
wherein the first pixel IC turns on the plurality of first LEDs connected to first to Nth channels of the first pixel IC in order, and the second pixel IC turns on the plurality of second LEDs connected to first to Nth channels of the second pixel IC in a reverse order.

3. The backlight system of claim 1,
wherein the data signal includes identification information and control data for each of the plurality of pixel ICs, and
wherein at least a portion of the plurality of pixel ICs select one piece of the control data from the data signal based on the identification information and output remaining pieces of control data from the data signal to another pixel IC of the plurality of pixel ICs.

4. The backlight system of claim 1,
wherein the data signal includes control data for each of the plurality of pixel ICs, and
wherein each of the plurality of pixel ICs selects one piece of the control data from the data signal based on an order of receiving the data signal, and outputs remaining pieces of control data from the data signal to another pixel IC of the plurality of pixel ICs.

5. The backlight system of claim 1, wherein, in at least one of the plurality of pixel ICs, a first number of LEDs from among the plurality of LEDs are connected to a first channel among the plurality of channels, and a second number of LEDs from among the plurality of LEDs are connected to a second channel among the plurality of channels, and
the second number of LEDs is different from the first number of LEDs.

6. The backlight system of claim 1, wherein a different one of the plurality of LEDs is connected to each of the plurality of channels.

7. The backlight system of claim 1,
wherein the driver IC includes a power circuit configured to output a power supply voltage for the plurality of pixel ICs, a converter circuit configured to supply a driving voltage to the plurality of LEDs, and a data circuit configured to output the data signal, and
wherein each of the plurality of pixel ICs includes at least one switch element connected to an output terminal, and a controller configured to control the at least one switch element to be turned on and off in response to control data included in the data signal, the output terminal connected to at least one LED from among the plurality of LEDs.

8. The backlight system of claim 7, wherein the controller outputs a control signal to a control terminal of the at least one switch element, and adjusts a duty ratio of the control signal with reference to the control data.

9. The backlight system of claim 1,
wherein each of the first pixel IC and the second pixel IC includes first to Nth channels from among the plurality of channels, where N is a natural number equal to or greater than 2,
wherein the first pixel IC turns on a portion of first LEDs among the plurality of first LEDs connected to first to Mth channels of the first pixel IC, and thereafter turns on remaining first LEDs among the plurality of first LEDs connected to M+1th to Nth channels of the first pixel IC of the first pixel IC, and
wherein the second pixel IC turns on a portion of second LEDs among the plurality of second LEDs connected to M+1th to Nth channels of the second pixel IC, and thereafter turns on remaining second LEDs connected to first to Mth channels of the second pixel IC.

10. The backlight system of claim 9, wherein N is a multiple of 2, and M is N/2.

11. The backlight system of claim 9, wherein the first pixel IC is disposed between the portion of first LEDs and the remaining first LEDs, and the second pixel IC is disposed between the portion of second LEDs and the remaining second LEDs.

12. A backlight system, comprising:
a circuit board;
a driver IC configured to output a data signal including a plurality of pieces of control data; and
a plurality of pixel ICs configured to control, based upon the data signal, a plurality of LEDs to be turned on and off, the plurality of pixel ICs connected to each other in series on the circuit board,
wherein an amount of control data in the data signals received by the plurality of pixel ICs is different from each other,
wherein the data signal comprises first control data that specifies a first order of turning on or off a plurality of first LEDs from among the plurality of LEDs and second control data that specifies a second order of turning on or off a plurality of second LEDs from among the plurality of LEDs, the first order being different from the second order,
wherein a first pixel IC among the plurality of pixel ICs is configured to turn the plurality of first LEDs on or off according to the first order, and a second pixel IC among the plurality of pixel ICs is configured to turn the plurality of second LEDs on or off according to the second order,
wherein the plurality of pixel ICs include a lead pixel IC directly connected to the driver IC, a plurality of intermediate pixel ICs connected to the lead pixel IC, and a last pixel IC connected to the plurality of intermediate pixel ICs,
wherein each of the plurality of intermediate pixel ICs is connected between a first neighboring pixel IC and a second neighboring pixel IC, receives the data signal from the first neighboring pixel IC, and outputs the data signal to the second neighboring pixel IC, and
wherein at least one of the plurality of intermediate pixel ICs is adjacent to the first neighboring pixel IC in a first direction and is adjacent to the second neighboring pixel IC in a second direction intersecting the first direction.

13. The backlight system of claim 12, wherein the plurality of LEDs and the plurality of pixel ICs are mounted on a first surface of the circuit board, and the driver IC is mounted on a second surface of the circuit board.

14. The backlight system of claim 12, wherein the circuit board, the plurality of LEDs, the plurality of pixel ICs, and the driver IC are disposed as an LED plate, and
wherein the backlight system includes a plurality of LED plates disposed adjacent to each other in a direction parallel to an upper surface of the circuit board.

15. The backlight system of claim 12, wherein the first direction and the second direction are perpendicular to each other.

16. The backlight system of claim 12, wherein a second intermediate pixel IC of the plurality of intermediate pixel ICs is adjacent to the first neighboring pixel IC in the second direction and is adjacent to the second neighboring pixel IC in the first direction.

17. A backlight system, comprising:
a circuit board;
a plurality of pixel ICs mounted on the circuit board, and connected to each other in series by wirings formed on the circuit board, each of the plurality of pixel ICs connected to a plurality of LEDs; and a driver IC configured to supply a data signal to the plurality of pixel ICs, wherein the plurality of pixel ICs includes a first pixel IC, a second pixel IC, and a third pixel IC, and a data signal input terminal of the second pixel IC is directly connected to a data signal output terminal of the first pixel IC by one of the wirings, and the data signal output terminal of the second pixel IC is connected to the data signal input terminal of the third pixel IC by another one of the wirings, wherein the data signal comprises first control data that specifies a first order of turning on or off a plurality of first LEDs from among the plurality of LEDs, second control data that specifies a second order of turning on or off a plurality of second LEDs from among the plurality of LEDs, and a third order of turning on or off a plurality of third LEDs from among the plurality of LEDs, the third order being different from the first order and from the second order, wherein the first pixel IC is configured to turn the plurality of first LEDs on or off according to the first order, the second pixel IC is configured to turn the plurality of second LEDs on or off according to the second order, and the third pixel IC is configured to turn the plurality of second LEDs on or off according to the third order, and wherein an amount of data of the data signal transmitted between the data signal output terminal of the first pixel IC and the data signal input terminal of the second pixel IC is different from an amount of data of the data signal transmitted between the data signal output terminal of the second pixel IC and the data signal input terminal of the third pixel IC.

18. The backlight system of claim 17, wherein the first pixel IC and the second pixel IC are adjacent to each other in a first direction, and the second pixel IC and the third pixel IC are adjacent to each other in a second direction intersecting the first direction, and wherein the third pixel IC is mounted on the circuit board rotated in a direction different from a direction of the first pixel IC and the second pixel IC.

* * * * *